United States Patent
Kim et al.

(10) Patent No.: US 9,953,680 B2
(45) Date of Patent: Apr. 24, 2018

(54) MOBILE TERMINAL AND METHOD FOR CONTROLLING THE SAME

(71) Applicant: LG ELECTRONICS INC., Seoul (KR)

(72) Inventors: Seongeun Kim, Seoul (KR); Raehoon Kang, Seoul (KR); Moonjung Kim, Seoul (KR); Hyomin Eum, Seoul (KR)

(73) Assignee: LG Electronics Inc., Seoul (KR)

( * ) Notice: Subject to any disclaimer, the term of this patent is extended or adjusted under 35 U.S.C. 154(b) by 39 days.

(21) Appl. No.: 15/160,819

(22) Filed: May 20, 2016

(65) Prior Publication Data

US 2017/0092329 A1 Mar. 30, 2017

(30) Foreign Application Priority Data

Sep. 25, 2015 (KR) ........................ 10-2015-0137029

(51) Int. Cl.
| | |
|---|---|
| *H04N 9/88* | (2006.01) |
| *G11B 27/036* | (2006.01) |
| *G06F 3/0488* | (2013.01) |
| *G06F 3/0481* | (2013.01) |
| *G06F 3/0482* | (2013.01) |
| *G06F 3/0484* | (2013.01) |

(52) U.S. Cl.
CPC .......... *G11B 27/036* (2013.01); *G06F 3/0482* (2013.01); *G06F 3/04817* (2013.01); *G06F 3/04845* (2013.01); *G06F 3/04883* (2013.01)

(58) Field of Classification Search
CPC ... G11B 27/034; G11B 27/34; G11B 2220/90; G11B 27/031; G11B 2220/20

USPC .......................................................... 386/280
See application file for complete search history.

(56) References Cited

U.S. PATENT DOCUMENTS

| | | | |
|---|---|---|---|
| 2009/0198747 A1* | 8/2009 | Kim | G06F 11/1435 |
| 2013/0243389 A1* | 9/2013 | Seto | H04N 5/772 |
| | | | 386/225 |
| 2015/0067514 A1* | 3/2015 | Lewis | G11B 27/031 |
| | | | 715/720 |

(Continued)

FOREIGN PATENT DOCUMENTS

| | | |
|---|---|---|
| EP | 2778898 A1 | 9/2014 |
| EP | 2838070 A2 | 2/2015 |
| JP | 2011029852 A | 2/2011 |

(Continued)

OTHER PUBLICATIONS

"Video Bench—Final Report", J. Chisan et al., University of Victoria, Apr. 11, 2003, XP-002662427.

*Primary Examiner* — William C Vaughn, Jr.
*Assistant Examiner* — Daniel Tekle
(74) *Attorney, Agent, or Firm* — Dentons US LLP

(57) ABSTRACT

The present invention relates to a mobile terminal capable of capturing videos, and a method of controlling the same. The mobile terminal includes a display unit capable of outputting a first video captured in response to a preset user input, and outputting a timeline of the first video in a camera preview mode, a camera capable of capturing a second video consecutive to the first video, in response to a preset user input, and a controller capable of storing the first video and the second video as one full video, and outputting a timeline of the full video, which a timeline of the second video follows the timeline of the first video, in the camera preview mode.

18 Claims, 23 Drawing Sheets

(56) References Cited

U.S. PATENT DOCUMENTS

2015/0156552 A1    6/2015  Wayans et al.
2016/0205302 A1\*  7/2016  Desai .................. H04N 5/2258
                                                           386/223

FOREIGN PATENT DOCUMENTS

| JP | 2011170783 A | 9/2011 |
| JP | 2014192532 A | 10/2014 |
| KR | 10-2005-0062118 A | 6/2005 |
| KR | 1020090113072 A | 10/2009 |
| WO | 2013023063 A1 | 2/2013 |

\* cited by examiner

FIG. 7
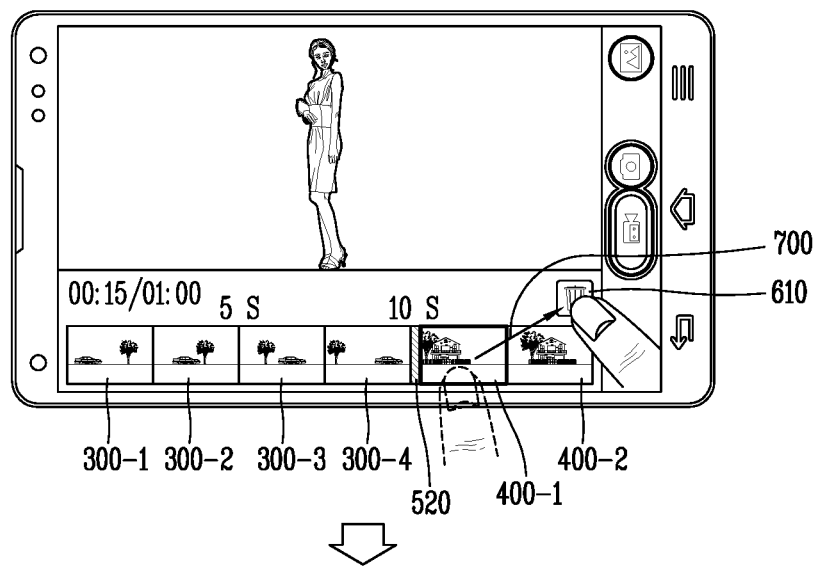
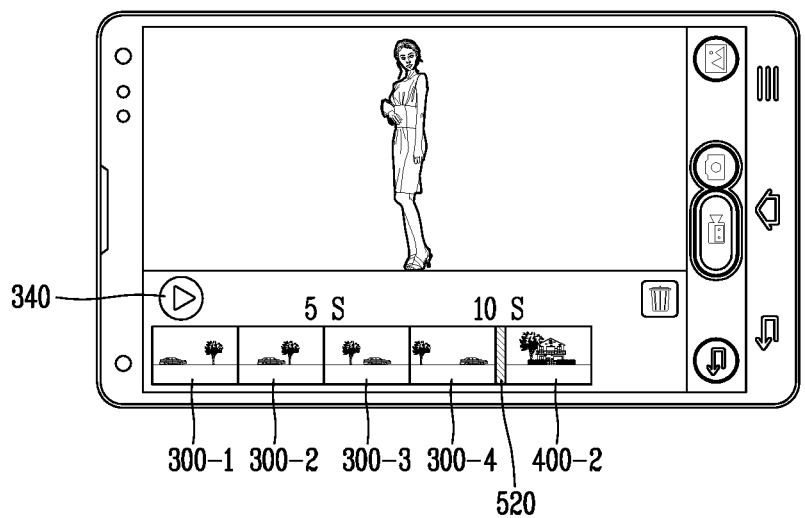

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0137029, filed on Sep. 25, 2015, the contents of which is incorporated by reference herein in its entirety.

BACKGROUND OF THE INVENTION

1. Field of the Invention

This specification relates to a mobile terminal capable of capturing videos, and a method for controlling the same.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

Meanwhile, in order to create one video using a first captured video and a second video which is additionally captured after the first video, separate edit tools should be used.

Efforts are ongoing to support and increase the functionality of mobile terminals. Such efforts include software and hardware improvements.

SUMMARY OF THE INVENTION

Therefore, an aspect of the detailed description is to solve the aforementioned problems and other drawbacks. Another aspect of the detailed description is to provide a mobile terminal, capable of generating one full video including a first video and a second video in a manner of capturing the second video after the first video is captured, and a method of controlling the same.

To achieve these and other advantages and in accordance with the purpose of this specification, as embodied and broadly described herein, there is provided a mobile terminal including a display unit capable of outputting a first video captured in response to a preset user input, and outputting a timeline of the first video in a camera preview mode, a camera capable of capturing a second video consecutive to the first video, in response to a preset user input, and a controller capable of storing the first video and the second video as one full video, and outputting a timeline of the full video, which a timeline of the second video follows the timeline of the first video, in the camera preview mode.

In an exemplary embodiment, the controller may output a plurality of thumbnail images corresponding to the first video and the second video, in response to a preset touch input applied to the timeline of the full video.

In another exemplary embodiment, the controller may output a thumbnail image corresponding to an applied point of a preset touch input, in response to the preset touch input applied to the timeline of the full video.

In another exemplary embodiment, the controller may output a delete icon at a position adjacent to the timeline of the full video. The delete icon may be provided for deleting at least one of the plurality of thumbnail images corresponding to the first video and the second video.

In another exemplary embodiment, the controller may edit at least one of the plurality of thumbnail images, in response to a preset touch input applied to the at least one thumbnail image.

In another exemplary embodiment, the controller may output a plurality of videos captured by a plurality of cameras on divided regions, respectively, in response to a preset user input, store the plurality of videos as a first full video, and output a timeline of the first full video in the camera preview mode.

In another exemplary embodiment, the controller may output a plurality of thumbnail images corresponding to the plurality of videos, respectively, in a dividing manner for each of the plurality of videos, in response to a preset touch input applied to the timeline of the first full video.

In another exemplary embodiment, the controller may edit at least one of the plurality of thumbnail images, in response to a preset touch input applied to the at least one thumbnail image.

In another exemplary embodiment, the controller may delete one of the plurality of thumbnail images and a video corresponding to the one thumbnail image, in response to a preset touch input applied to the one thumbnail image, and edit a video recaptured by a camera, which has captured the video corresponding to the deleted thumbnail image, to be a part of the first full video, in response to a preset user input.

In another exemplary embodiment, the controller may capture a second full video consecutive to the first full video in response to a preset user input, store the first full video and the second full video as a third full video, and output a timeline of the third full video in the camera preview mode.

To achieve these and other advantages and in accordance with the purpose of this specification, as embodied and broadly described herein, there is provided a method for controlling a mobile terminal, the method including (a) outputting a first video captured in response to a preset touch input, and outputting a timeline of the first video in a camera preview mode, (b) capturing a second video consecutive to the first video in response to a preset user input, and (c) storing the first video and the second video as one full video, and outputting a timeline of the full video, which a timeline of the second video follows the timeline of the first video, in the camera preview mode.

In an exemplary embodiment, the step (c) may include outputting a plurality of thumbnail images corresponding to the first video and the second video, in response to a preset touch input applied to the timeline of the full video.

In another exemplary embodiment, the step (c) may include outputting a thumbnail image corresponding to an applied point of a preset touch input, in response to the preset touch input applied to the timeline of the full video.

In another exemplary embodiment, the step (c) may include outputting a delete icon at a position adjacent to the timeline of the full video. The delete icon may be provided for deleting at least one of the plurality of thumbnail images corresponding to the first video and the second video.

In another exemplary embodiment, the step (c) may include editing at least one of the plurality of thumbnail images, in response to a preset touch input applied to the at least one thumbnail image.

In another exemplary embodiment, the step (a) may include outputting a plurality of videos captured by a plurality of cameras on divided regions, respectively, in response to a preset user input, storing the plurality of videos as a first full video, and outputting a timeline of the first full video in the camera preview mode.

In another exemplary embodiment, the step (a) may include outputting a plurality of thumbnail images corresponding to the plurality of videos, respectively, in a dividing manner for each of the plurality of videos, in response to a preset touch input applied to the timeline of the first full video.

In another exemplary embodiment, the step (a) may include editing at least one of the plurality of thumbnail images, in response to a preset touch input applied to the at least thumbnail image.

In another exemplary embodiment, the step (a) may include deleting one of the plurality of thumbnail images and a video corresponding to the one thumbnail image, in response to a preset touch input applied to the one thumbnail image, and editing a video recaptured by a camera, which has captured the video corresponding to the deleted thumbnail image, to be a part of the first full video, in response to a preset user input.

In another exemplary embodiment, the step (b) may include capturing a second full video consecutive to the first full video in response to a preset user input, and the step (c) may include storing the first full video and the second full video as a third full video, and outputting a timeline of the third full video in the camera preview mode.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 7 is a conceptual view illustrating another embodiment of deleting a part of the thumbnail images output in FIG. 5;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
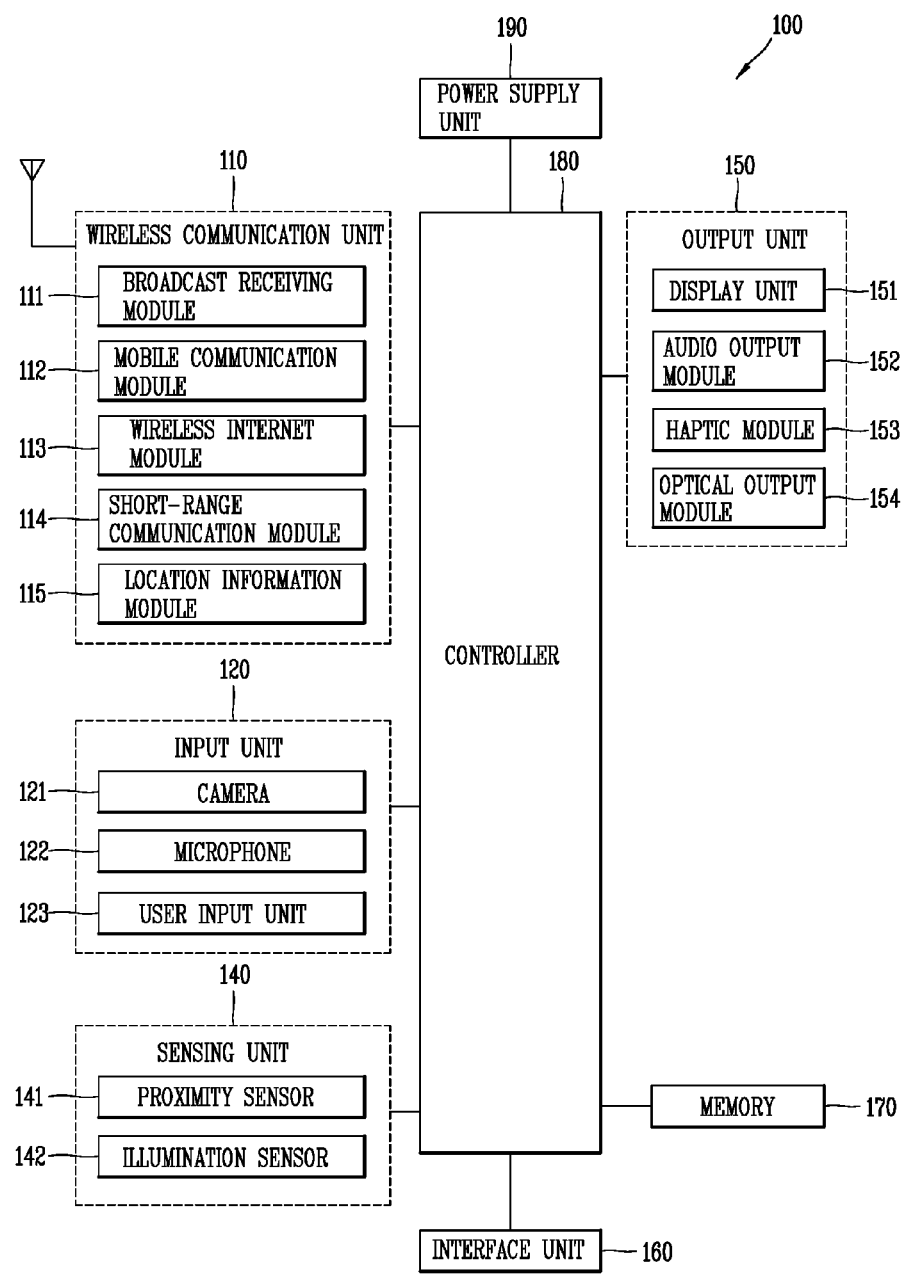
FIG. 1A is a block diagram of a mobile terminal in accordance with one exemplary embodiment of the present invention.
Figure 1B:
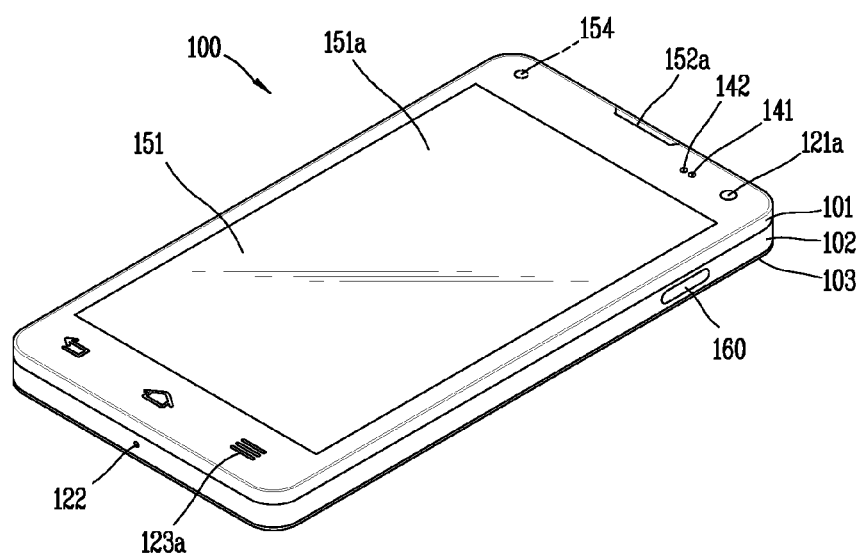
FIGS. 1B and 1C are conceptual views illustrating one example of a mobile terminal, viewed from different directions.
Figure 1C:
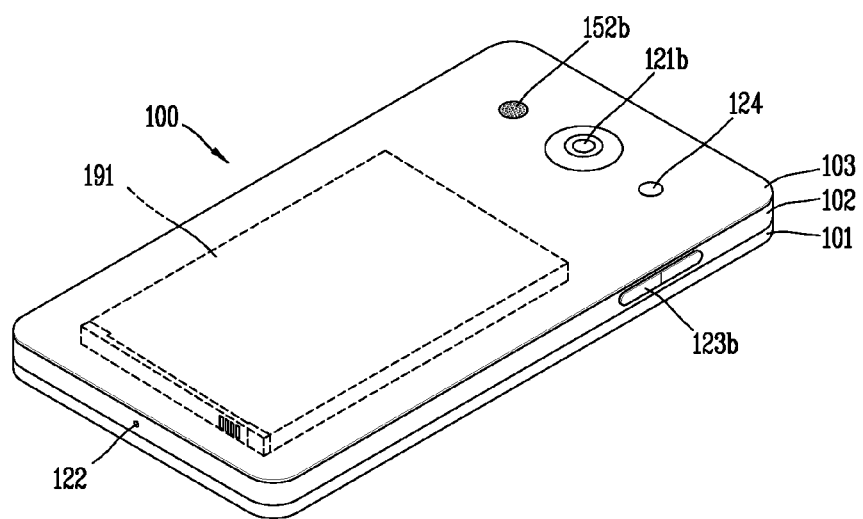

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor may be configured to sense a touch input using a different method, in an activated or deactivated state of the display unit 151. The different method may be related to an activation period of the touch sensor. More specifically, the touch sensor may be activated at a different period according to whether the display unit 151 has been activated or not. That is, the touch sensor may have a different activation period according to whether the display unit 151 has been activated or not, and may sense a touch input applied thereto.

For instance, in a deactivated state of the display unit 151, the touch sensor may be activated with a preset period. In this instance, the preset period may be a time period more than 0. Further, in an activated state of the display unit 151, the touch sensor may be always operated in an activated state. In this instance, an activation period of the touch sensor may be '0' or a value very close to '0'.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. Further, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for input of taps onto the display unit 151, while maintaining an activated state. Further, if the display unit 151 is in a deactivated state (hereinafter, will be referred to as a doze mode), the touch sensor may be activated at preset periods.

When the preset period of the touch sensor is shorter, a sensing speed with respect to taps applied onto the display unit 151 is higher. However, in this instance, a power consumption amount of the touch sensor may be increased. Further, when the preset period of the touch sensor is longer, a sensing speed with respect to taps applied onto the display unit 151 may be lower, while a power consumption amount of the touch sensor is decreased.

Thus, the preset period may be set so that a sensing speed with respect to taps applied onto the display unit 151 is high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a doze state and the touch sensor is periodically activated, if a preset touch input (e.g., a first touch input and a second touch input consecutively knocking-on a predetermined region within a predetermined time) is sensed by the touch sensor, the controller 180 can convert the doze mode into an active mode where the flexible display unit and the touch sensor are activated.

The touch sensor may be driven at a different period based on a state of the display unit 151. For instance, when the display unit 151 is in a closed state, a doze mode may be executed. Further, when a closed state is converted into an open state, an active mode may be executed.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors (TR) at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the flexible display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control an operation associated with an application program and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 10:
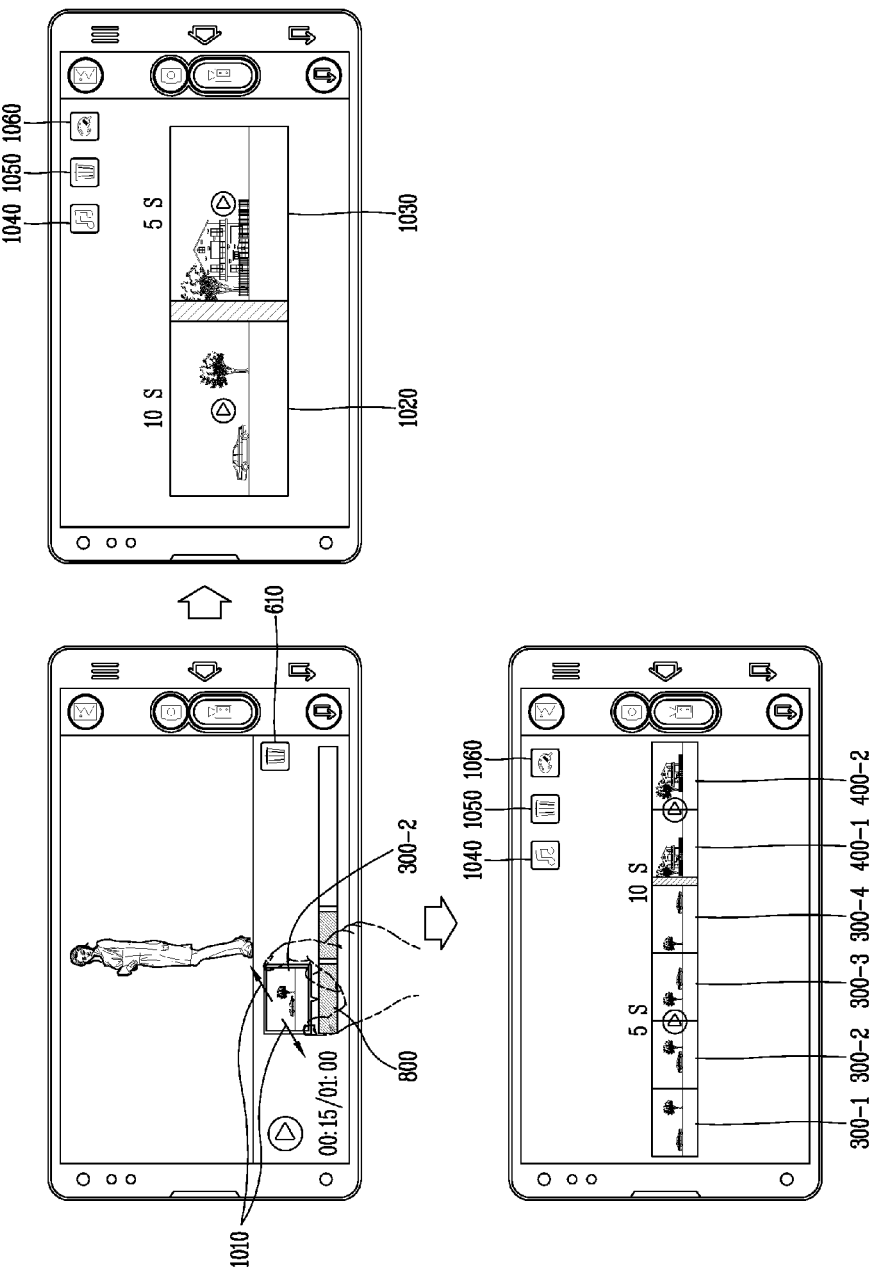
FIG. 10 is a conceptual view illustrating an embodiment of outputting video clips corresponding to the full video generated in FIG. 4.

Referring now to FIGS. 1B and 10, the mobile terminal 100 is described with reference to a bar-type the body of the portable electronic device. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of portable electronic device (for example, bar-type, watch-type, glasses-type, and the like). However, such teachings with regard to a particular type of portable electronic device will generally apply to other types of mobile terminals as well.

The body of the mobile terminal may be understood to indicate the mobile terminal 100 by regarding the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, description will be given of embodiments related to a control method which can be implemented in the mobile terminal having such configuration, with reference to the accompanying drawings. It will be obvious to those skilled in the art that the present invention can be specified into other specific forms without departing from the scope and essential features of the present invention.

Figure 2:
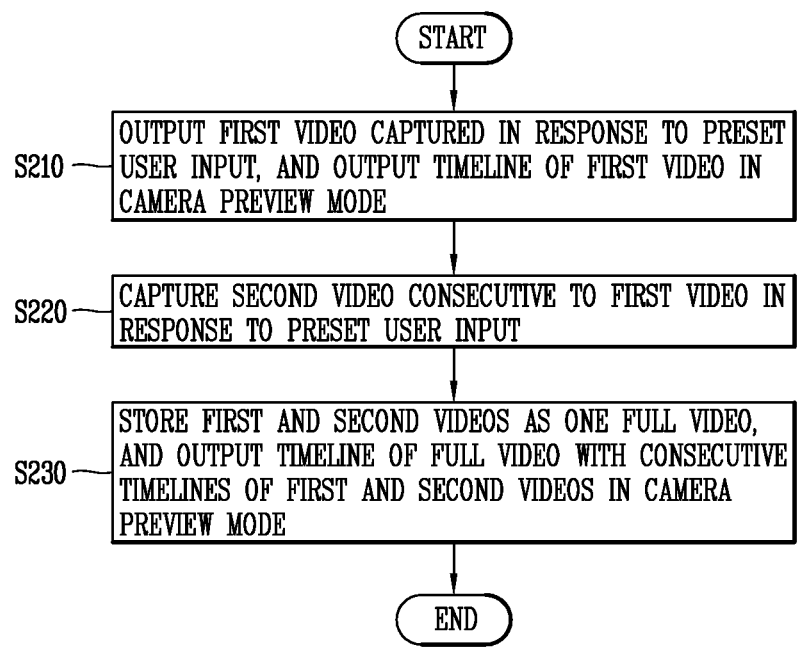
FIG. 2 is a flowchart illustrating a method of controlling a mobile terminal in accordance with the present invention.

FIG. 2 is a flowchart illustrating a method of controlling a mobile terminal in accordance with the present invention.

As illustrated in FIG. 2, a first video which is captured in response to a preset user input may be output, and a timeline of the first video may be output in a camera preview mode (S210).

In detail, when a preset user input is applied, a video may be captured (taken, recorded, shot) by a front or rear camera

121*a* or 121*b*. For example, when a touch input is applied to a video capture icon, a video may be captured for a preset period of time.

The camera preview mode refers to a state in which a camera application has been executed before a user input for video capturing is applied. That is, when the camera application is executed, timelines of a video viewed by the camera 121 prior to video capturing and a previously-captured video may be output on the screen 151.

In this instance, a timeline of a video is arranged along a captured sequence of video clips, and may be output on one region of a lower end of the screen 151.

Afterwards, a second video consecutive to the first video may be captured in response to a preset touch input (S220).

In an exemplary embodiment, when a touch input is applied to the video capture icon, a second video consecutive to the previously-captured first video may be captured. Accordingly, a full video that the first video and the second video consecutive to the first video are formed into one video may be generated.

Next, the first video and the second video may be stored as one full video, and a timeline of the full video that a timeline of the second video are consecutive to a timeline of the first video may be output in the camera preview mode (S230).

For example, the timeline of the full video may be output on one region of the lower end of the screen 151 in the camera preview mode.

Meanwhile, the first video and the second video may be videos or capture images. In an exemplary embodiment, a video and a capture image consecutive to the video may be stored as one full video.

Hereinafter, a detailed exemplary embodiment will be described.

In an exemplary embodiment, the step S230 may include outputting a plurality of thumbnail images corresponding to the first video and the second video, in response to a preset touch input to the timeline of the full video.

In another exemplary embodiment, the step S230 may include outputting a delete icon for deleting at least one of the plurality of thumbnail images corresponding to the first video and the second video, at a position adjacent to the timeline of the full video.

In another exemplary embodiment, the step S230 may include editing at least one of the plurality of thumbnail images, in response to a preset touch input applied to the at least one thumbnail image.

In another exemplary embodiment, the step S210 may include outputting a plurality of videos captured by a plurality of cameras on divided regions, respectively, in response to a preset user input, storing the plurality of videos as a first full video, and outputting a timeline of the first full video in the camera preview mode.

In another exemplary embodiment, the step S210 may include outputting a plurality of thumbnail images corresponding to the plurality of videos in a dividing manner, for each of the plurality of videos, in response to a preset touch input applied to a timeline of the first full video.

In another exemplary embodiment, the step S210 may include editing at least one of the plurality of thumbnail images, in response to a preset touch input applied to the at least one thumbnail image.

In another exemplary embodiment, the step S210 may include deleting one of the plurality of thumbnail images and a video corresponding to the one thumbnail image, in response to a preset touch input applied to the one thumbnail image, and editing a video re-captured by a camera, which has captured the video corresponding to the deleted thumbnail image, to be a part of the first full video, in response to a preset touch input.

In another exemplary embodiment, the step S220 may include capturing a second full video which is consecutive to the first full video, in response to a preset user input, and the step S230 may include storing both of the first full video and the second full video as a third full video, and outputting a timeline of the third full video in the camera preview mode.

Hereinafter, detailed embodiments will be described from the perspective of components.

The display unit or the screen 151 may output a first video which is captured in response to a preset user input, and output a timeline of the first video in a camera preview mode.

The camera 121 may capture a second video, which is consecutive to the first video, in response to a preset user input.

The controller 180 may store the first video and the second video as one full video, and output in the camera preview mode a timeline of the full video that a timeline of the second video is consecutive to the timeline of the first video.

In an exemplary embodiment, the controller 180 may output a plurality of thumbnail images corresponding to the first video and the second video, in response to a preset touch input applied to the timeline of the full video.

In another exemplary embodiment, the controller 180 may output a thumbnail image corresponding to an applied point of a preset touch input, in response to the preset touch input applied to the timeline of the full video.

In another exemplary embodiment, the controller 180 may output a delete icon, which allows for deleting at least one of a plurality of thumbnail images corresponding to the first video and the second video, at a position adjacent to the timeline of the full video.

In another exemplary embodiment, the controller 180 may edit at least one of the plurality of thumbnail images, in response to a preset touch input applied to the at least one thumbnail image.

In another exemplary embodiment, the controller 180 may output a plurality of videos, which are captured by a plurality of cameras, on divided regions, respectively, in response to a preset user input. Then, the controller 180 may store the plurality of videos as a first full video, and output a timeline of the first full video in the camera preview mode.

In another exemplary embodiment, the controller 180 may output a plurality of thumbnail images corresponding to the plurality of videos, respectively, in a dividing manner for each of the plurality of videos, when a preset touch input is applied to a timeline of the first full video.

In another exemplary embodiment, the controller 180 may edit at least one of the plurality of thumbnail images, in response to a preset touch input applied to the at least one thumbnail image.

In another exemplary embodiment, the controller 180 may delete one of the plurality of thumbnail images and a video corresponding to the one thumbnail image, in response to a preset touch input applied to the one thumbnail image, and edit a video re-captured by a camera, which has captured the video corresponding to the deleted thumbnail image, to be a part of the first full video, in response to a preset touch input.

In another exemplary embodiment, the controller 180 may capture a second full video consecutive to the first full video, in response to a preset user input. The controller 180 may then store both of the first full video and the second full video as one full video, namely, a third full video, and output a timeline of the third full video in the camera preview mode.

The term 'full video' described in this specification should be understood as a conception including a plurality of videos captured by a consecutive capture command. For example, 'full video' may include a first video and a second video which is captured after the first video is captured.

In another exemplary embodiment, the term 'full video' may include a plurality of videos which are captured by a plurality of cameras, respectively. For example, the first full video may include a video captured by a front camera, and a video simultaneously captured by a rear camera.

Detailed embodiments related to these will be described later.

Figure 3:
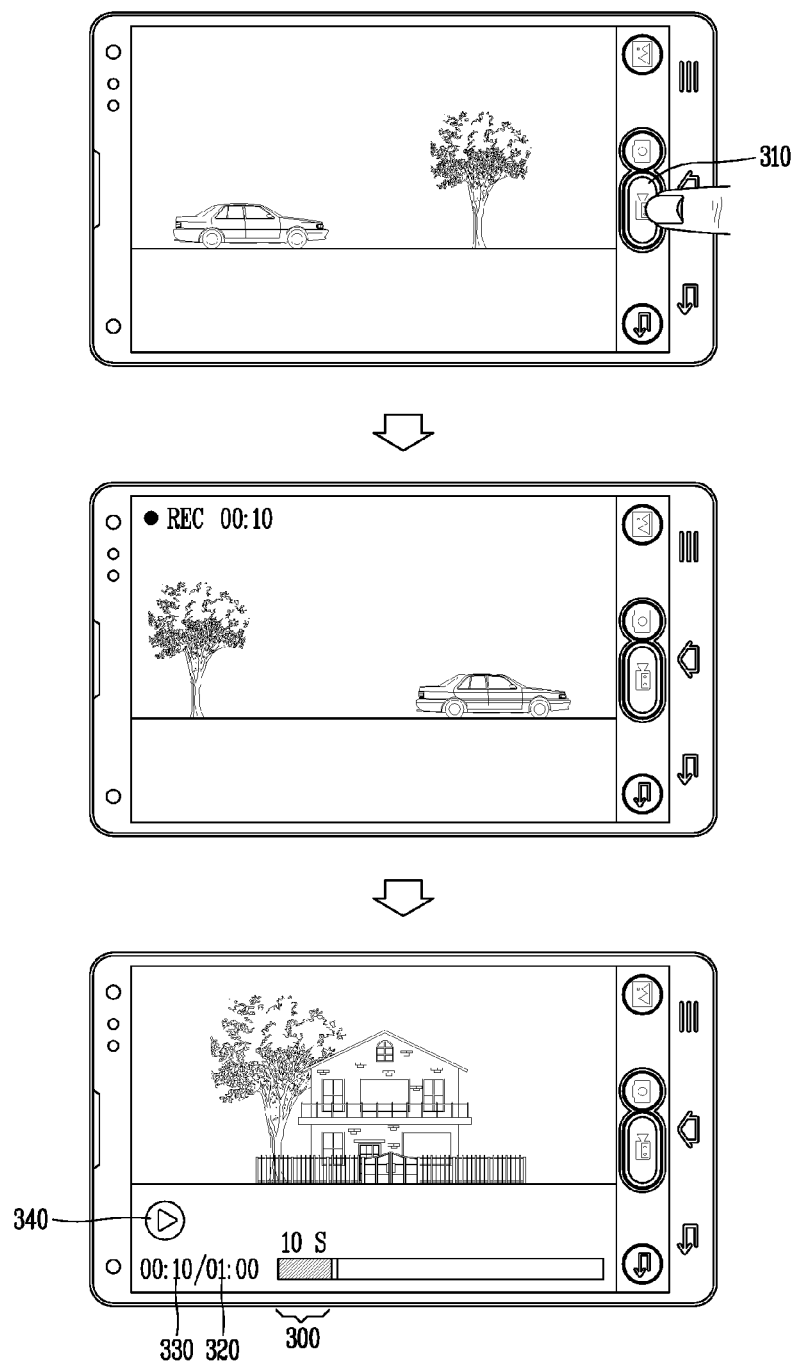
FIG. 3 is a conceptual view illustrating an embodiment of capturing (taking, making, shooting, etc.) a video.

FIG. 3 is a conceptual view illustrating an embodiment of capturing (taking, making or shooting) a video.

As illustrated in FIG. 3, when a long touch input is applied to a video capture icon 310 in a camera preview mode, a first video may be captured for ten seconds.

In one exemplary embodiment, a video may be captured for a preset period of time in response to a touch input. For example, when a long touch input is applied to the video capture icon 310, a user may directly set a video capture time in advance.

In another exemplary embodiment, when a short touch input is applied to the video capture icon 310, a first video may be captured for three seconds.

In another exemplary embodiment, when a short touch input is applied to the video capture icon 310, a first video may be captured. Afterwards, when the short touch input is applied to the video capture icon 310 again, the capturing of the first video may be terminated.

When the capturing of the first video is completed, the camera preview mode may be reactivated, and a preview video viewed by the camera 121 may be output on the screen 151. In this instance, a timeline 300 of the completely-captured first video may be output at the lower end of the screen 151.

In detail, the timeline 300 of the first video may include video clips of the first video which are arranged in a captured sequence. In this instance, the last image of the video clips of the first video may be output as a thumbnail image (video clip) on the timeline 300 of the first video. Also, a time 320 for which a video or videos can be captured or recorded as one full video, and a captured time 330 may be output.

In this manner, after the first video is captured, when a touch input is applied to a reproduction (or playback) icon 340 in the camera preview mode, the first video may be reproduced.

Figure 4:
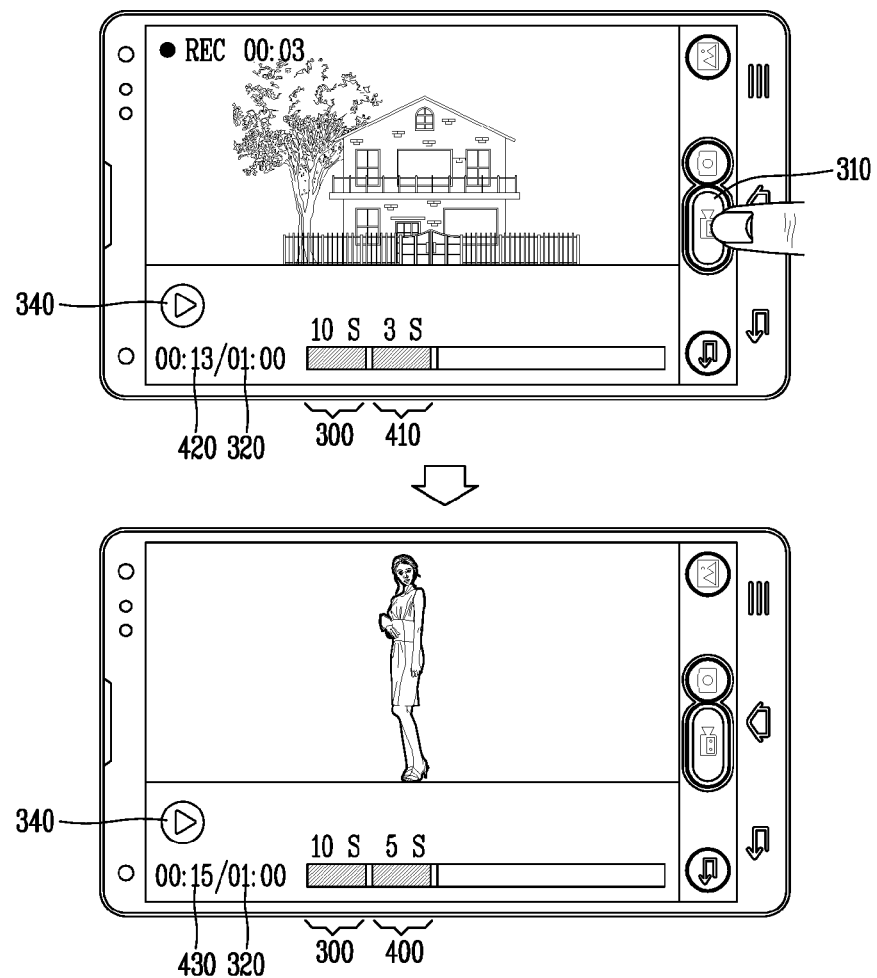
FIG. 4 is a conceptual view illustrating an embodiment of capturing a video consecutive to the video taken in FIG. 3.

FIG. 4 is a conceptual view illustrating an embodiment of capturing a video consecutive to the video captured in FIG. 3.

As illustrated in FIG. 4, the second video may be captured while a touch input is applied to the video capture icon 310 in the camera preview mode.

While the second video is captured, a timeline 410 of the currently-captured second video may be output consecutive to the timeline 300 of the first video illustrated in FIG. 3. Also, a captured time 420 that a captured time of the currently-captured second video is added to the captured time of the first video may be output.

When a finger which currently touches the capture icon 310 is released after a lapse of a predetermined time, the capturing of the second video may be completed. Accordingly, the first video and the second video consecutive to the first video may be generated into one full video, and the generated full video may be stored in the memory 170.

Also, as the capturing of the second video is completed, the camera preview mode may be reactivated, and a preview video viewed by the camera 121 may be output on the screen 151. In this instance, the timeline 300 and 400 of the full video may be output on the lower end of the screen 151.

In detail, the timeline 300 and 400 of the full video may include the timeline 300 of the completely-captured first video and the timeline 400 of the second video consecutive to the first video.

That is, the timeline 300 and 400 of the full video may include video clips of the first video and the second video which are arranged in the captured sequence. In this instance, the last image of the video clips of the first video and the last image of the video clips of the second video may be output as thumbnail images on the timeline 300 and 400 of the full video.

Also, a time 320 for which a video or videos can be recorded as one full video, and a captured time 430 of the first video and the second video may be output.

In this manner, after the second video is captured, when a touch input is applied to the reproduction icon 340 in the camera preview mode, the full video may be reproduced. That is, the second video may be reproduced consecutively (immediately) after the first video is reproduced.

According to the embodiment of FIGS. 3 and 4, a third video may additionally be captured consecutive to the first video and the second video, in response to a touch input reapplied to the capture icon 310. Accordingly, the first, second and third videos may be stored as one full video, and a timeline of the full video may be output in the camera preview mode.

That is, the user can capture a video or photo (image) consecutive to a previously-captured video, and the captured video or image can be stored as one file along with the previously-captured video.

Meanwhile, the controller 180 may output a plurality of thumbnail images corresponding to the first video and the second video, in response to a preset touch input applied to the timeline of the full video.

Figure 5:
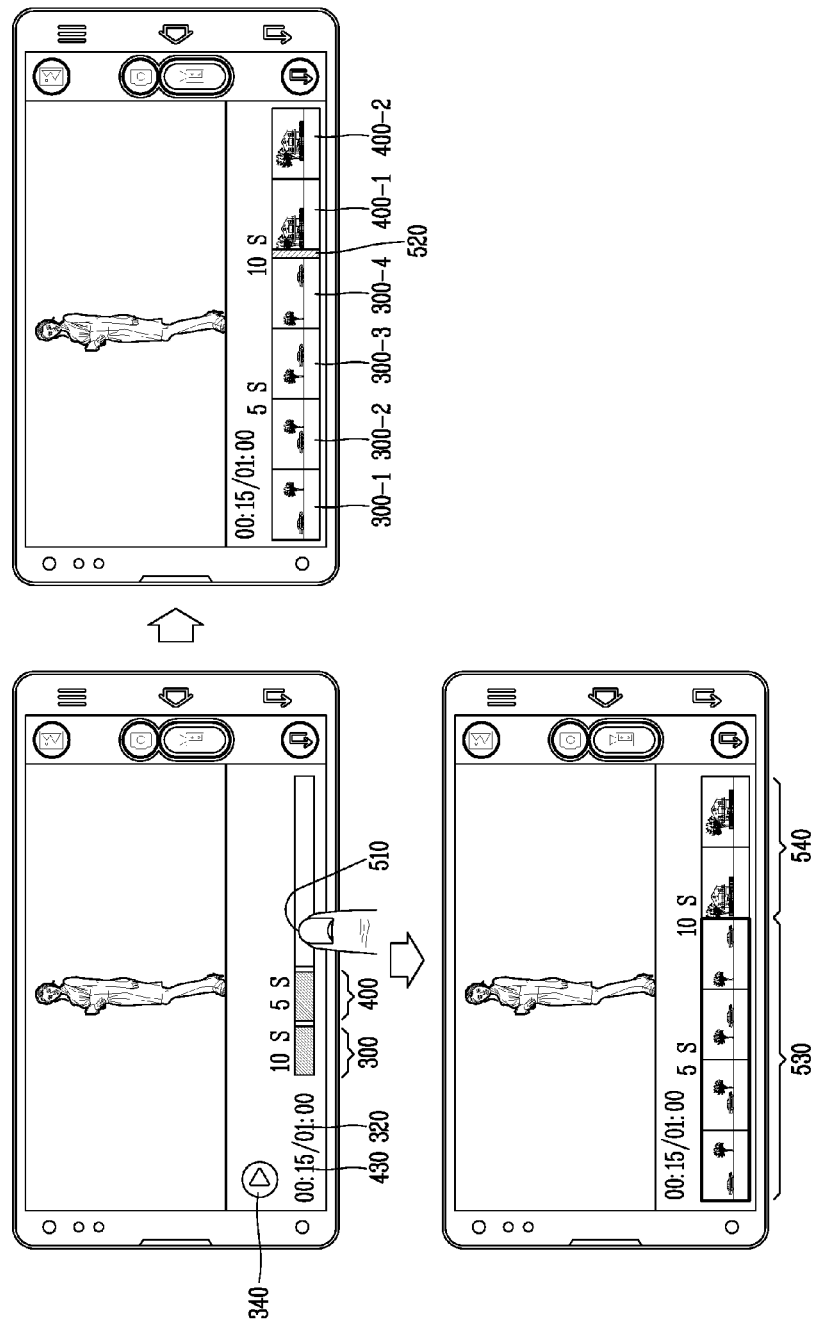
FIG. 5 is a conceptual view illustrating an embodiment of outputting thumbnail images corresponding to a full video generated in FIG. 4.

FIG. 5 is a conceptual view illustrating an embodiment of outputting thumbnail images corresponding to the full video generated in FIG. 4.

As illustrated in FIG. 5, when a long touch input 510 is applied to the timeline of the full video illustrated in FIG. 4, a plurality of thumbnail images 300-1, 300-2, 300-3, 300-4, 400-1 and 400-2 corresponding to the full video may be output.

In detail, the plurality of thumbnail images 300-1, 300-2, 300-3 and 300-4 corresponding to the first video may be output in a unit of a preset time. Also, the plurality of thumbnail images 400-1 and 400-2 corresponding to the second video may be consecutively output.

In this instance, a visual effect may be output to discriminate between the plurality of thumbnail images 300-1, 300-2, 300-3 and 300-4 corresponding to the first video and the plurality of thumbnail images 400-1 and 400-2 corresponding to the second video.

In an exemplary embodiment, a boundary line 520 may be output between the plurality of thumbnail images 300-1, 300-2, 300-3 and 300-4 corresponding to the first video and the plurality of thumbnail images 400-1 and 400-2 corresponding to the second video.

In another exemplary embodiment, an outline 530 including the plurality of thumbnail images 300-1, 300-2, 300-3 and 300-4 corresponding to the first video and an outline 540 including the plurality of thumbnail images 400-1 and 400-2 corresponding to the second video may be output in a manner of having different colors or thicknesses from each other.

In another exemplary embodiment, when it is difficult to output all of the plurality of thumbnail images corresponding to the full video on the screen 151, the user may view the plurality of thumbnail images corresponding to the full video, like turning pages, by applying a flicking input to left or right.

Meanwhile, the controller 180 may output a delete icon, for deleting at least one of the plurality of thumbnail images corresponding to the first and second videos, at a position adjacent to the timeline of the full video.

Figure 6:
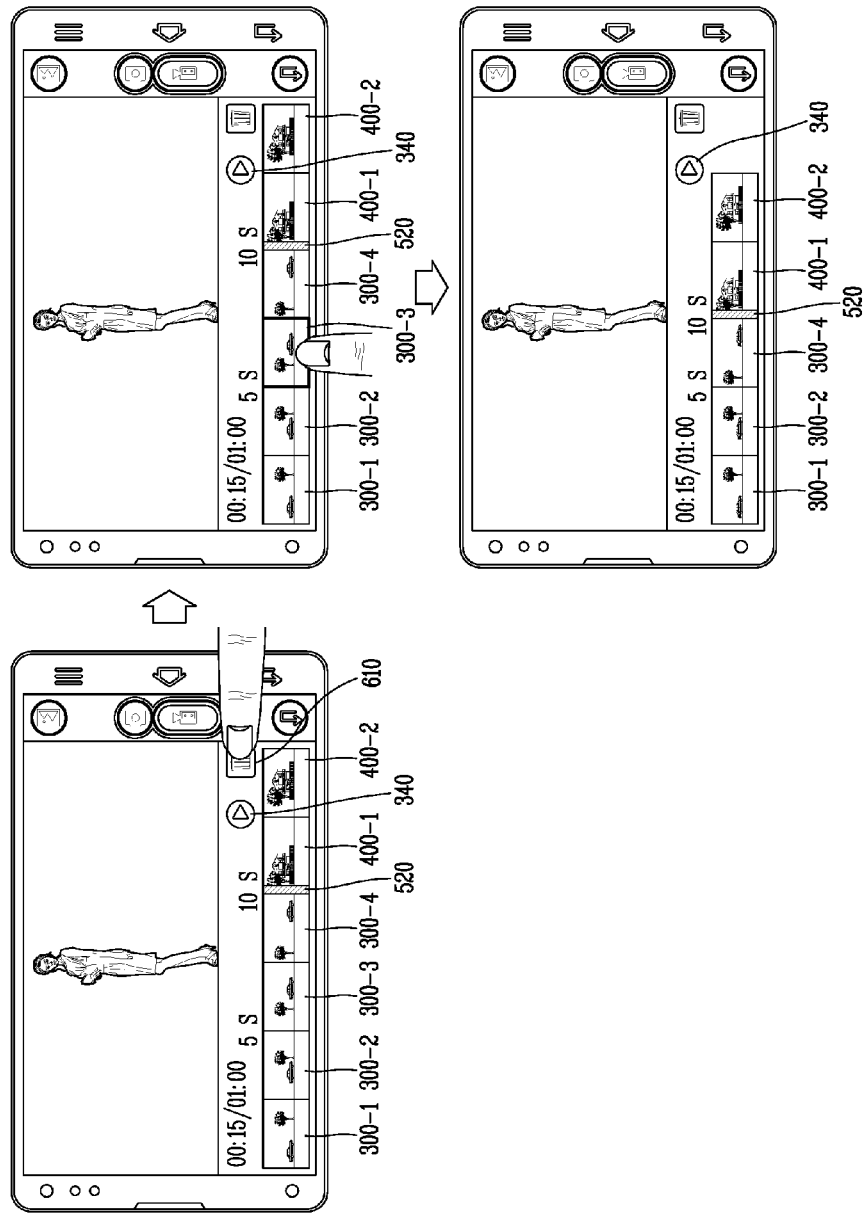
FIG. 6 is a conceptual view illustrating an embodiment of deleting a part of the thumbnail images output in FIG. 5.

FIG. 6 is a conceptual view illustrating an embodiment of deleting a part of thumbnail images output in FIG. 5.

As illustrated in FIG. 6, a delete icon 610 may be output adjacent to the plurality of thumbnail images corresponding to the full video illustrated in FIG. 5.

In an exemplary embodiment, when a touch input is applied to the thumbnail image 300-3 desired to be deleted after the delete icon 610 is selected, the thumbnail image 300-3 may be deleted from the plurality of thumbnail images corresponding to the full video.

Afterwards, when a touch input is applied to the reproduction icon 340, the full video, from which a video clip corresponding to the thumbnail image 300-3 has been deleted, may be reproduced. In detail, after the first video from which the corresponding video clip has been deleted is reproduced, the second video may be consecutively reproduced.

In another exemplary embodiment, after applying a touch input to the delete icon 610, a plurality of thumbnail images may be selected and deleted.

FIG. 7 is a conceptual view illustrating another embodiment of deleting a part of the thumbnail images output in FIG. 5.

As illustrated in FIG. 7, similar to FIG. 6, the delete icon 610 may be output adjacent to the plurality of thumbnail images corresponding to the full video.

In an exemplary embodiment, after a touch input is applied to the thumbnail image 400-1 desired to be deleted, when a drag input 700 is applied toward the delete icon 610, the thumbnail image 400-1 may be deleted from the plurality of thumbnail images corresponding to the full video.

Afterwards, when a touch input is applied to the reproduction icon 340, the full video from which a video clip corresponding to the thumbnail image 400-1 has been deleted may be reproduced. In detail, after the first video is reproduced, the second video from which the corresponding video clip has been deleted may be consecutively reproduced.

In another exemplary embodiment, after selecting a plurality of thumbnail images, when a drag input is applied toward the delete icon 610, the selected thumbnail images may be deleted.

Meanwhile, the controller 180 may output a thumbnail image corresponding to an applied point of a preset touch input, when the preset touch input is applied to the timeline of the full video.

Figure 8:
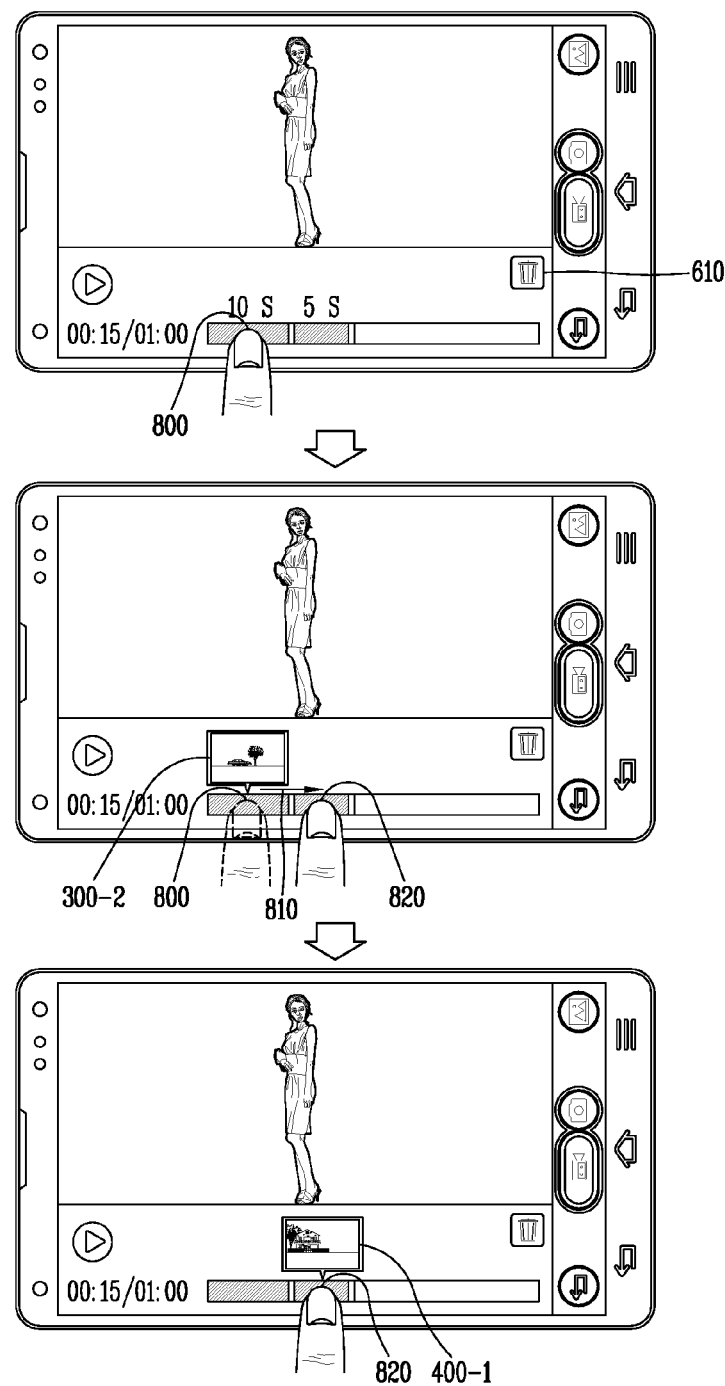
FIG. 8 is a conceptual view illustrating an embodiment of outputting a part of the thumbnail images corresponding to the full video generated in FIG. 4.

FIG. 8 is a conceptual view illustrating an embodiment of outputting a part of the thumbnail images corresponding to the full video generated in FIG. 4.

As illustrated in FIG. 8, when a long touch input is applied to one point 800 of the timeline of the full video illustrated in FIG. 4, the thumbnail image 300-2 corresponding to the point 800 may be output.

In another exemplary embodiment, when a touch input is applied to the thumbnail image 300-2, the full video may be reproduced on an output region of the thumbnail image 300-2. In detail, the full video may be reproduced on the output region, starting from the point corresponding to the thumbnail image 300-2.

Afterwards, the user can check a desired thumbnail image by applying a drag input to left or right with a finger, with which the touch input has been applied.

In an exemplary embodiment, when a drag input 810 to right is applied, the thumbnail image 400-1 corresponding to a moved point 820 of the finger may be output.

Figure 9:
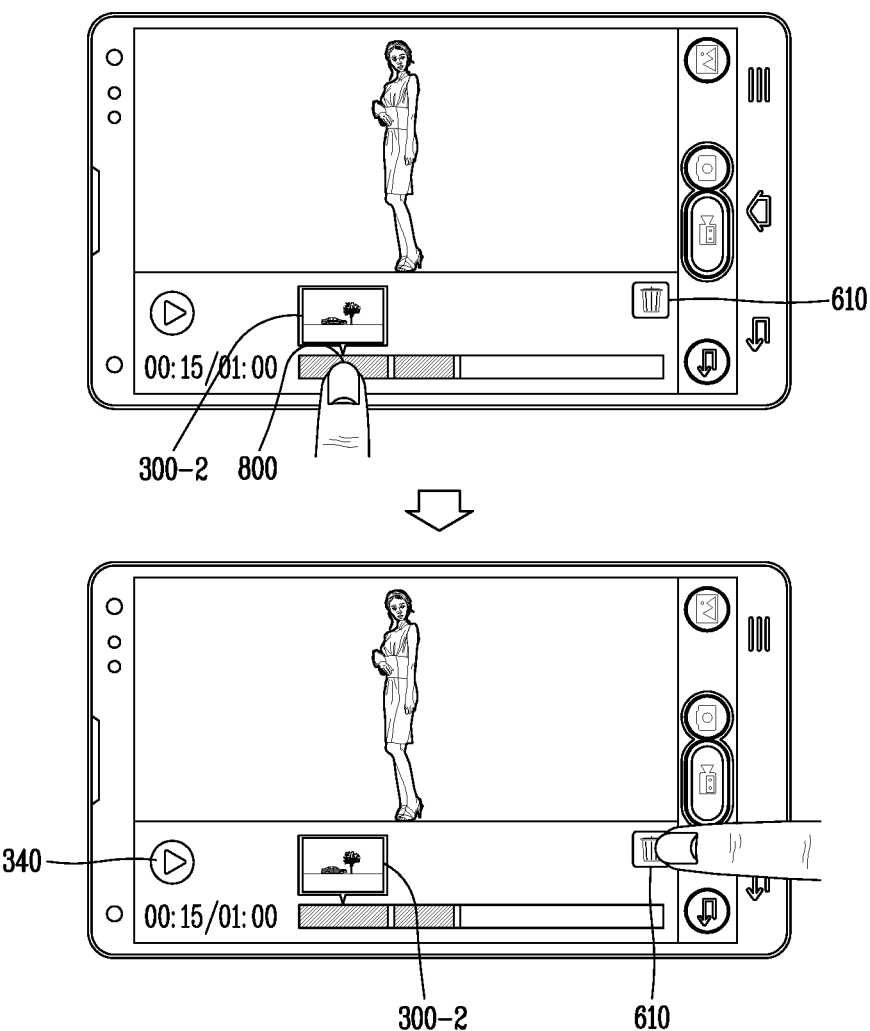
FIG. 9 is a conceptual view illustrating an embodiment of deleting a part of the thumbnail images output in FIG. 8.

FIG. 9 is a conceptual view illustrating an embodiment of deleting a part of thumbnail images output in FIG. 8.

As illustrated in FIG. 9, similar to FIG. 8, when a long touch input is applied to the one point 800 of the timeline of the full video, the thumbnail image 300-2 corresponding to the point 800 may be output.

Afterwards, a touch input is applied to the delete icon 610, the thumbnail image 300-2 corresponding to the point 800 may be deleted.

In another exemplary embodiment, the thumbnail image 300-2 corresponding to the point 800 may be deleted by dragging the thumbnail image 300-2 corresponding to the point 800 toward the delete icon 610.

Afterwards, when a touch input is applied to the reproduction icon 340, the full video from which a video clip corresponding to the thumbnail image 300-2 has been deleted may be reproduced.

Meanwhile, the controller 180 may edit at last one of the plurality of thumbnail images, in response to a preset touch input applied to the at least one thumbnail image.

In detail, the at least one thumbnail image may be some of the thumbnail images included in the first video or the second video. The at least one video may also be the first video or the second video.

FIG. 10 is a conceptual view illustrating an embodiment of outputting video clips corresponding to the full video generated in FIG. 4.

As illustrated in FIG. 4, when a pinch-out input 1010 is applied to the thumbnail image 300-2 corresponding to the applied point 800 of the touch input illustrated in FIG. 8, the timeline of the full video may be enlarged. Or, the timeline of the full video may be enlarged when a double-tap input is applied to the timeline of the full video.

In an exemplary embodiment, a video clip 1020 corresponding to the first video and a video clip 1030 corresponding to the second video may be output in an enlarged manner. Also, edit icons 1040, 1050 and 1060 for editing the video clips may be output.

In this instance, detailed attribute information related to the video clips 1020 and 1030 may additionally be output. For example, whether or not the video clip is a video or a captured image, a video reproduction time or the like may be output, as the attribute information.

Continuously in the embodiment, after a delete icon 1050 of the edit icons 1040, 1050 and 1060 is selected, when a touch input is applied to the video clip 1030 corresponding to the second video, the second video may be deleted from the full video. Afterwards, when a touch input is applied to the reproduction icon 340 in the camera preview mode, the full video without the second video may be reproduced.

In another exemplary embodiment, the plurality of thumbnail images 300-1, 300-2, 300-3 and 300-4 corresponding to the first video and the plurality of thumbnail images 400-1 and 400-2 corresponding to the second video may be output in the enlarged manner. Similarly, the edit icons 1040, 1050 and 1060 for editing those thumbnail images may be output.

Continuously in the another embodiment, after the delete icon 1050 is selected, when a touch input is applied to at least one of the plurality of thumbnail images, a video clip corresponding to the at least one thumbnail image applied with the touch input may be deleted from the full video.

Afterwards, when a touch input is applied to the reproduction icon 340 in the camera preview mode, the full video without the video clip may thusly be output. For example, a part of the first video or a part of the second video may be deleted from the full video.

Hereinafter, another embodiment of editing video clips will be described with reference to FIGS. 11 to 13.

Figure 11:
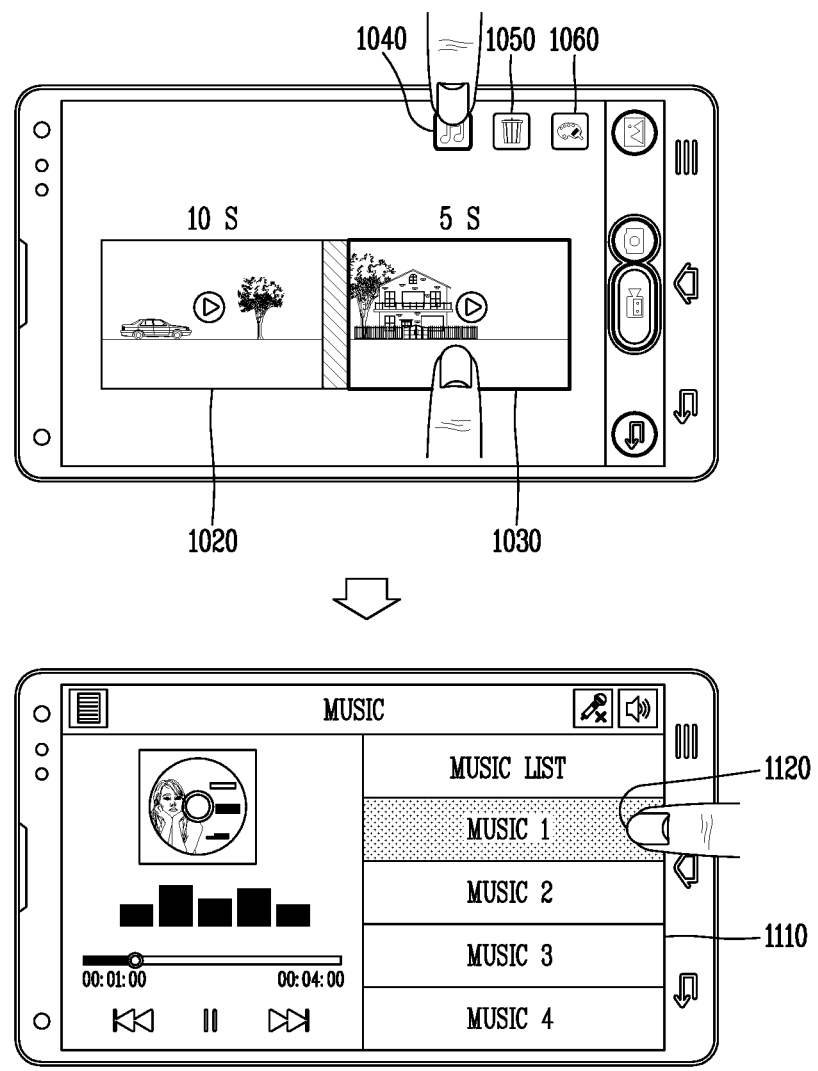
FIG. 11 is a conceptual view illustrating an embodiment of inserting music (or music file) in a part of the video clips output in FIG. 10.

FIG. 11 is a conceptual view illustrating an embodiment of inserting music (or music file) into a part of the video clips output in FIG. 10.

As illustrated in FIG. 11, after a BGM icon 1040 is selected, when a touch input is applied to the video clip 1030 corresponding to the second video, a popup window 1110 including a list of music (files) to be insertable may be output. When a touch input 1120 is applied to one music in the music list, the one music may be played back at a reproduction time point of the second video.

In an exemplary embodiment, the list of music to be inserted may be preset by a user, or may be a list of music files that the user has frequently played back. Or, the list of music may be a list of music recommended as music appropriate for the currently-selected second video.

In detail, when a touch input is applied to the reproduction icon 340 in the camera preview mode later, the full video may be reproduced. In this instance, the second video may be reproduced along with the music consecutively (immediately) after the first video is reproduced.

In another exemplary embodiment, after the BGM icon 1040 is selected, a touch input may be applied to at least one of the plurality of thumbnail images 300-1, 300-2, 300-3, 300-4, 400-1 and 400-2 illustrated in FIG. 10. Similarly, the popup window 1110 including the list of music files to be insertable may be output, and one music file may be selected from the list.

Afterwards, when a touch input is applied to the reproduction icon 340 in the camera preview mode, the full video may thusly be reproduced. In this instance, the video clip corresponding to the thumbnail image applied with the touch input may be reproduced along with the selected music. That is, the music may simultaneously be reproduced at a reproduction time point of the thumbnail image during the reproduction of the full video.

Figure 12:
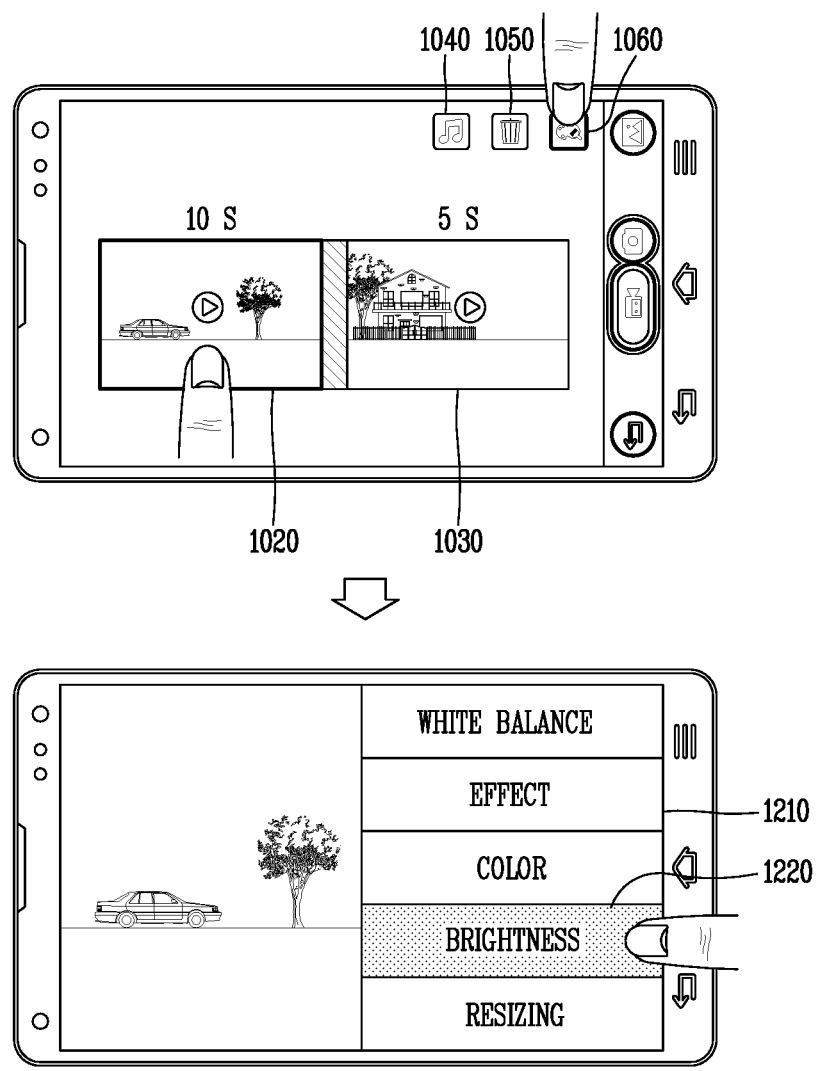
FIG. 12 is a conceptual view illustrating an embodiment of applying an image effect to a part of the video clips output in FIG. 10.

FIG. 12 is a conceptual view illustrating an embodiment of applying an image effect to a part of the video clips output in FIG. 10.

As illustrated in FIG. 12, after an effect icon 1060 is selected, when a touch input is applied to the video clip 1020 corresponding to the first video, a popup window 1210 including a list of image effects to be applicable may be output. When a touch input 1220 is applied to one of the image effects, the effect may be applied during the reproduction of the first video.

In detail, when a touch input is applied to the reproduction icon 340 in the camera preview mode later, the full video may be reproduced. In this instance, when an effect of making an image bright, the first video of which brightness has been adjusted may be reproduced, and the second video may be reproduced, immediately following the first video.

In another exemplary embodiment, after the effect icon 1060 is selected, a touch input may be applied to at least one of the plurality of thumbnail images 300-1, 300-2, 300-3, 300-4, 400-1 and 400-2 illustrated in FIG. 10. Similarly, the popup window 1210 including the list of image effects to be applicable may be output, and one image effect may be selected from the list.

Afterwards, when a touch input is applied to the reproduction icon 340 in the camera preview mode, the full video may thusly be reproduced. In this instance, the video clip corresponding to the thumbnail image applied with the touch input may be reproduced with the effect applied thereto. That is, a video can be reproduced bright at the reproduction time point of the thumbnail image during the reproduction of the full video.

Figure 13:
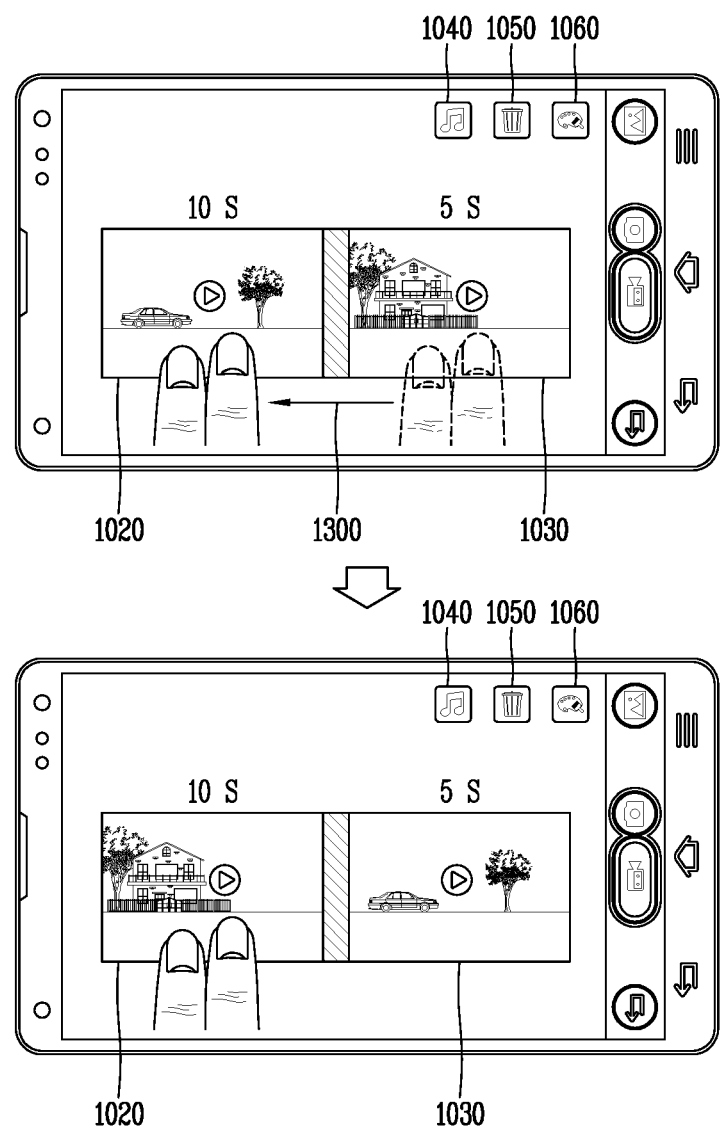
FIG. 13 is a conceptual view illustrating an embodiment of changing a sequence of video clips output in FIG. 10.

FIG. 13 is a conceptual view illustrating an embodiment of changing a sequence of video clips output in FIG. 10.

As illustrated in FIG. 13, after applying a touch input with two fingers to the video clip 1030 corresponding to the second video, a drag input 1300 may be applied toward the video clip 1020 corresponding to the first video.

Accordingly, the arranged sequences of the first video and the second video may change. That is, when a touch input is applied to the reproduction icon 340 in the camera preview mode later, the first video may be reproduced consecutive to the second video.

In another exemplary embodiment, after applying a touch input with two fingers to at least one of the plurality of thumbnail images 300-1, 300-2, 300-3, 300-4, 400-1 and 400-2 illustrated in FIG. 10, a drag input may be applied toward a point corresponding to a reproduction time point desired to be changed.

Accordingly, the sequence of the full video may change. In detail, when a touch input is applied to the reproduction icon 340 in the camera preview mode later, a video clip corresponding to a thumbnail image, which has been selected at the reproduction time point desired to be changed, may be reproduced during the reproduction of the full video.

That is, according to the embodiment of FIGS. 10 to 13, the full video can be edited in the unit of a captured video or an image included in a video.

Meanwhile, the controller 180 may output a plurality of videos captured by a plurality of cameras, in response to a preset user input, on divided regions, respectively. The controller 180 may then store the plurality of videos as one full video, namely, a first full video, and output a timeline of the first full video in the camera preview mode.

A plurality of cameras may be provided at front and rear surfaces of the terminal 100, respectively. For example, two front cameras and one rear camera may be provided.

Figure 14:
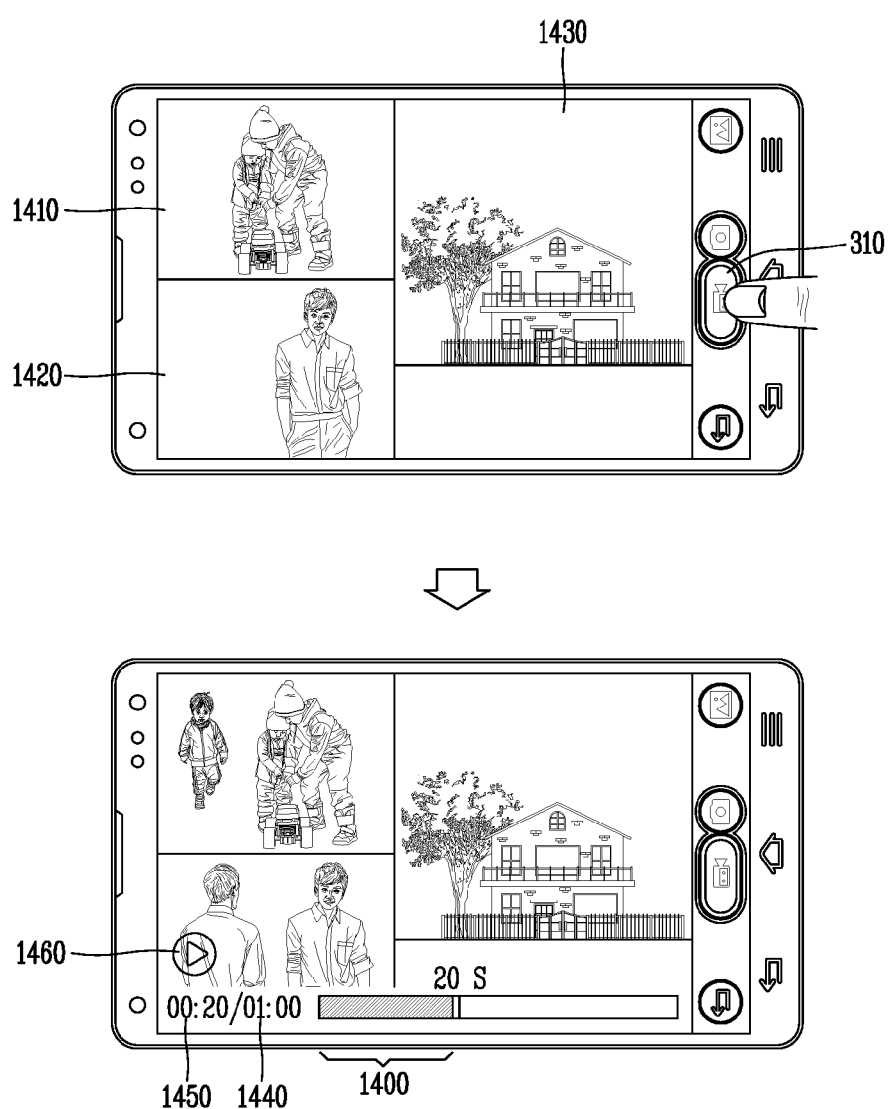
FIG. 14 is a conceptual view illustrating an embodiment of capturing videos by a plurality of cameras.

FIG. 14 is a conceptual view illustrating an embodiment of capturing videos by a plurality of cameras.

As illustrated in FIG. 14, videos captured by a first front camera and a second front camera may be output on a first region 1410 and a second region 1020, respectively. Also, a video captured by a rear camera may be output on a third region 1430.

In an exemplary embodiment, when a touch input is applied to the video capture icon 310, the videos captured by each camera may be output on the regions 1410, 1420 and 1430, respectively. Afterwards, when a touch input is applied to the video capture icon 310 again, the video capturing may be terminated.

In this instance, a video-capturing time may differ according to a touch method.

In an exemplary embodiment, videos may be captured by each camera while a touch input is applied to the video capture icon 310. Afterwards, when a finger which has applied the touch input is released, the video capturing may be terminated.

In another exemplary embodiment, video capturing may be carried out for a preset period of time according to a touch method. For example, when a long touch input is applied to the video capture icon 310, videos may be captured for ten seconds by each camera. When a short touch input is applied to the video capture icon 310, videos may be captured for three seconds by each camera.

When the video capturing is completed, those videos captured by each of the cameras may be generated into one full video (e.g., first full video), and the generated first full video may be stored in the memory 170.

In an exemplary embodiment, a timeline 1400 of the first full video may be output in the camera preview mode after the completion of the video capturing. Also, a time 1440 for which a video or videos can be consecutively captured as one full video, a captured time 1450 of the first full video, and a reproduction icon 1460 may be output.

In this instance, when a touch input is applied to the reproduction icon 1460, the first full video may be reproduced. In detail, the video captured by the first front camera may be reproduced on the first region 1410, the video captured by the second front camera may be reproduced on the second region 1420, and the video captured by the rear camera may be reproduced on the third region 1430, respectively.

Meanwhile, the user can select a camera for capturing a video from a plurality of cameras.

Figure 15:
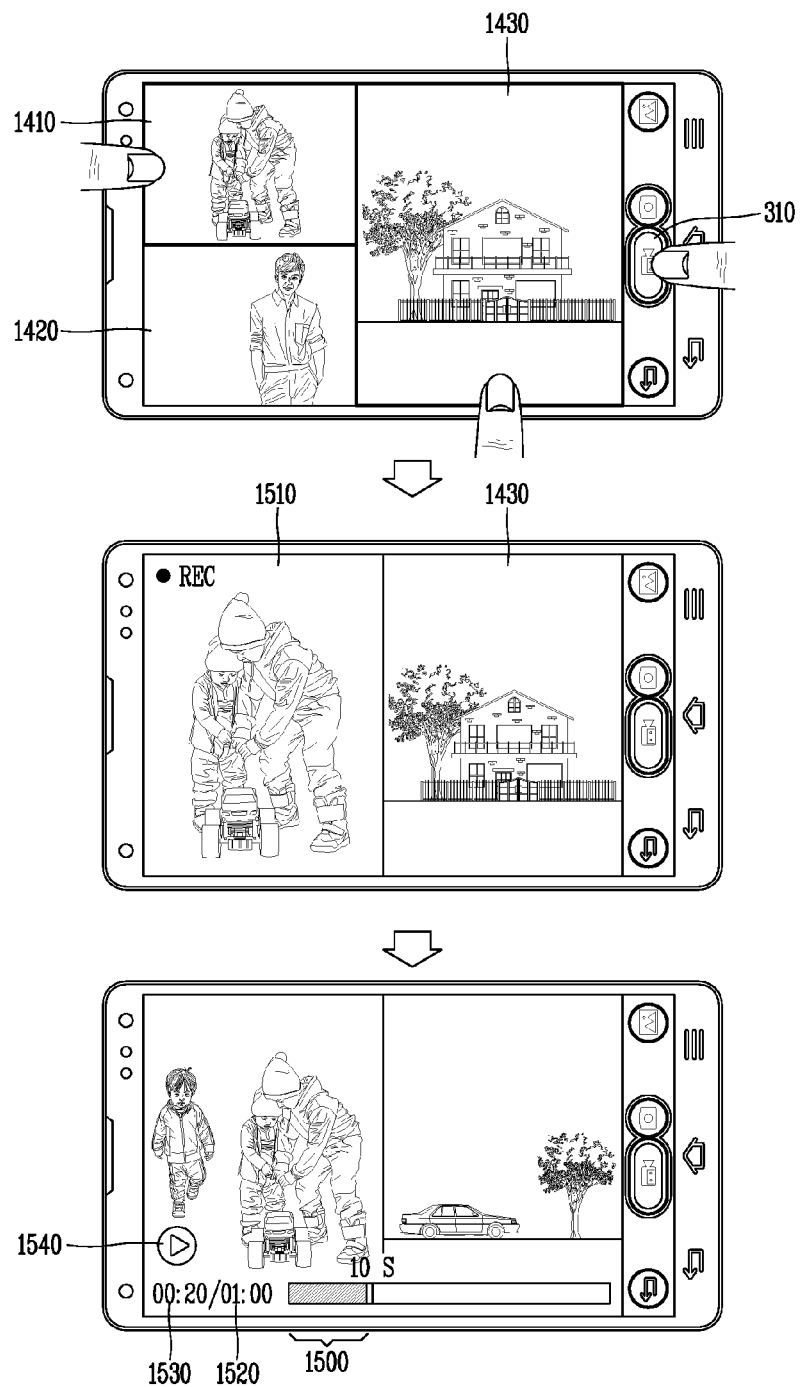
FIG. 15 is a conceptual view illustrating an embodiment of capturing videos by some of the plurality of cameras.

FIG. 15 is a conceptual view illustrating an embodiment of capturing videos by some of the plurality of cameras.

Referring back to FIG. 14, when a touch input is applied to the video capture icon 310, the video which is captured by the first front camera may be output on the first region 1410, the video which is captured by the second front camera may be output on the second region 1420, and the video which is captured by the rear camera may be output on the third region 1430.

In another exemplary embodiment, when a touch input is applied to the video capture icon 310, a video may be captured by the first front camera for a predetermined period of time. Afterwards, a video may be captured by the second front camera for a predetermined period of time. That is, a capturing sequence may be set for each of the plurality of cameras.

Referring to FIG. 15, a camera to be used for capturing a video may be selected by applying a touch input to a divided screen region. In an exemplary embodiment, when touch inputs (taps or long touch inputs) are applied to the first region 1410 and the third region 1430, the first front camera and the rear camera may be selected as the camera for capturing the video.

In another exemplary embodiment, cameras to be used for capturing videos may be selected by applying touch inputs to a plurality of capture icons corresponding to divided screen regions, respectively. That is, the first front camera and the rear camera may be selected as the cameras to be used for capturing the videos by applying a touch input to the capture icon corresponding to the first region 1410 and the capture icon corresponding to the third region 1430.

Afterwards, when a touch input is applied to the video capture icon 310, the video captured by the first front camera may be output on a 1-2 region 1510 as a combined region of the first region 1410 and the second region 1420, and a video captured by the rear camera may be output on the third region 1430.

As described with reference to FIG. 14, when video capturing is completed, those videos captured by the respective cameras may be generated into one full video (first full video), and the generated first full video may be stored in the memory 170.

In an exemplary embodiment, a timeline 1500 of the first full video may be output in the camera preview mode after the completion of the video capturing. Also, a time 1520 for which videos can be consecutively captured as one full video, a captured time 1530 of the first full video, and a reproduction icon 1540 may be output.

In this instance, when a touch input is applied to the reproduction icon 1540, the first full video may be reproduced. In detail, the video captured by the first front camera may be reproduced on the 1-2 region 1510 and the video captured by the rear camera may be reproduced on the third region 1430.

Meanwhile, the controller 180 may capture a second full video consecutive to the first full video, in response to a preset touch input. The controller 180 may then store both of the first full video and the second full video as one full video, namely, a third full video, and output a timeline of the third full video in the camera preview mode.

In this instance, the second full video may be videos captured by a plurality of cameras, or a video captured by one camera.

Figure 16:
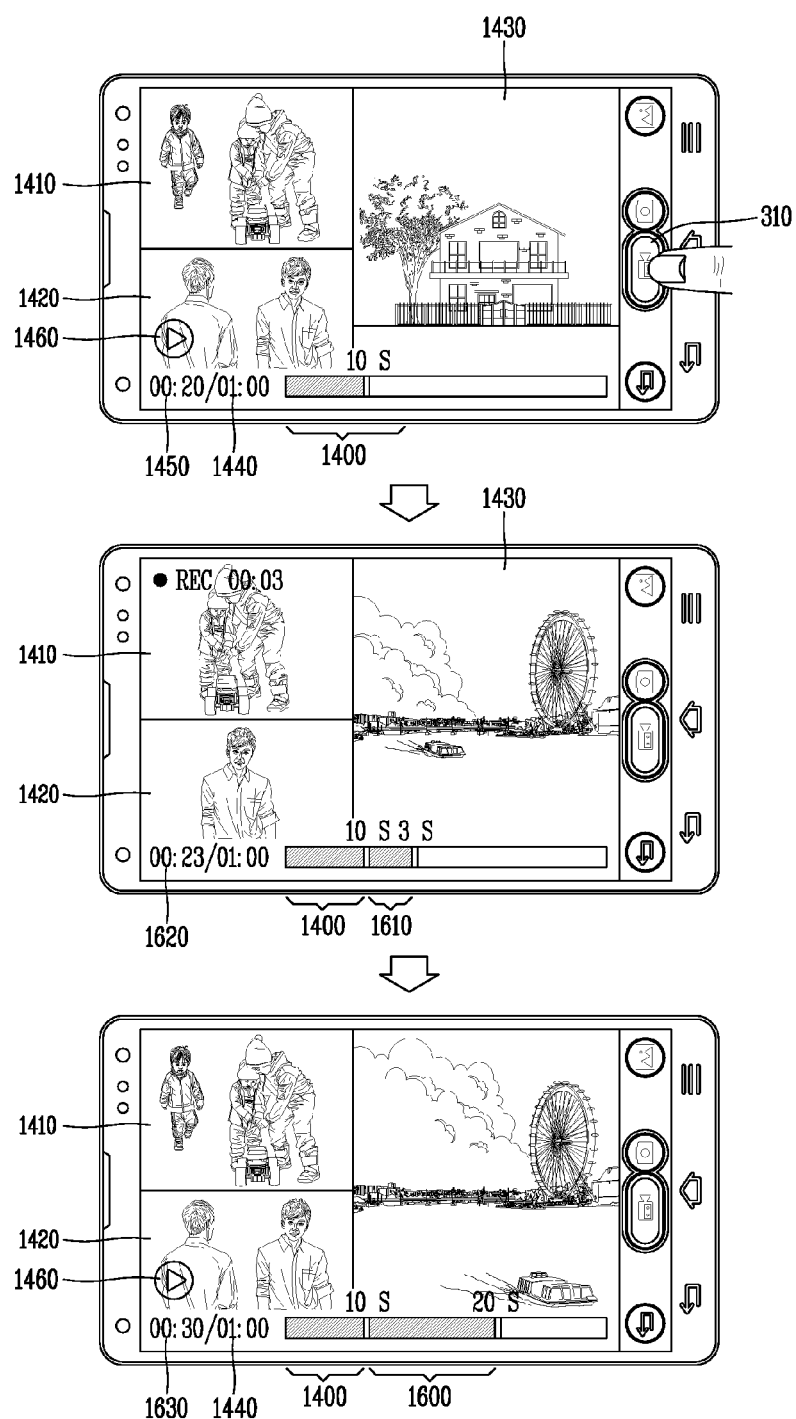
FIG. 16 is a conceptual view illustrating an embodiment of capturing a video consecutive to the video captured in FIG. 14.

FIG. 16 is a conceptual view illustrating an embodiment of capturing a video continuing the video captured in FIG. 14.

Referring to FIG. 16, as aforementioned in FIG. 14, when video capturing is completed, videos captured by respective cameras may be generated into one full video (first full video), and the generated first full video may be stored in the memory 170.

In an exemplary embodiment, the timeline 1400 of the first full video may be output in the camera preview mode after the video capturing is completed. Also, the time 1440 for which videos can be consecutively captured as one full video, the captured time 1450 of the first full video, and the reproduction icon 1460 may be output.

Afterwards, a touch input is applied to the video capture icon 310 again, the videos captured by the first front camera, the second front camera and the rear camera, respectively, may be output on the respective regions 1410, 1420 and 1430, and video capturing (second full video) may be started.

In this instance, a timeline 1610 of a currently-captured video may be output consecutive to the timeline 1400 of the first full video, and a captured time added with the captured time of the first full video may be output according to a lapse of time.

When the second full video is completely captured, the first full video and the second full video consecutive to the first full video may be generated into one full video (third full video), and the generated third full video may be stored in the memory 170.

In an exemplary embodiment, a timeline of the third full video may be output in the camera preview mode after the second full video is completely captured. In detail, the timeline of the third full video may include timelines 1400 and 1600 of the first full video and the second full video.

Also, the time 1440 for which videos can be consecutively captured as one full video, the captured time 1450 of the first full video, and the reproduction icon 1460 may be output. In this instance, when a touch input is applied to the reproduction icon 1460, the third full video may be reproduced. In detail, after the first full video is reproduced, the second full video may be reproduced consecutive to the first full video.

Figure 17:
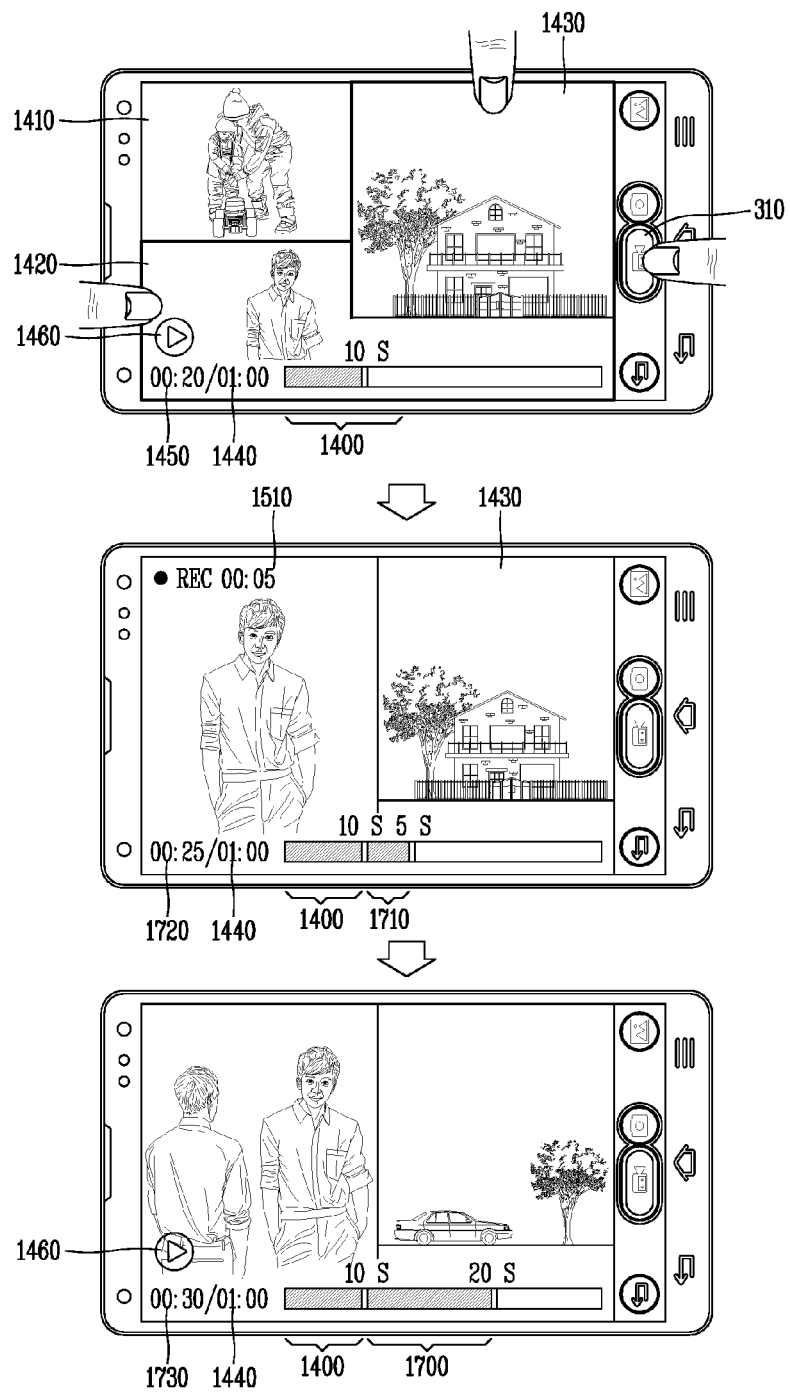
FIG. 17 is a conceptual view illustrating another embodiment of capturing a video consecutive to the video captured in FIG. 14.

FIG. 17 is a conceptual view illustrating another embodiment of capturing a video consecutive to the video captured in FIG. 14.

Referring to FIG. 17, as aforementioned in FIG. 14, when video capturing is completed, videos captured by respective cameras may be generated into one full video (first full video), and the generated first full video may be stored in the memory 170.

In an exemplary embodiment, the timeline 1400 of the first full video may be output in the camera preview mode after the video capturing is completed. Also, the time 1440 for which videos can be consecutively captured as one full video, the captured time 1450 of the first full video, and the reproduction icon 1460 may be output.

In this instance, when touch inputs are applied to the second region 1420 and the third region 1430, the second front camera and the rear camera may be selected as cameras to be used for capturing videos. Afterwards, when a touch input is applied to the video capture icon 310, the videos captured by the second front camera and the rear camera may be output on the 1-2 region 1510 as the combined region of the first region 1410 and the second region 1410, and the video capturing (second full video) may be started.

As described with reference to FIG. 16, a timeline 1710 of a currently-captured video may be output consecutive to the timeline 1400 of the first full video, and a captured time 1720 added with the captured time of the first full video may be output according to a lapse of time.

When the second full video is completely captured, the first full video and the second full video consecutive to the first full video may be generated into one full video (third full video), and the generated third full video may be stored in the memory 170.

In an exemplary embodiment, a timeline of the third full video may be output in the camera preview mode after the second full video is completely captured. In detail, the timeline of the third full video may include timelines 1400 and 1700 of the first full video and the second full video.

Also, the time 1440 for which videos can be consecutively captured as one full video, the captured time 1450 of the first full video, and the reproduction icon 1460 may be output. In this instance, when a touch input is applied to the reproduction icon 1460, the third full video may be reproduced. In detail, after the first full video is reproduced, the second full video may be reproduced consecutive to the first full video.

That is, the first full video may be reproduced in a manner of outputting the videos on the first region 1410, the second region 1420 and the third region 1430, respectively. Consecutive to this, the second full video may be reproduced in a manner of outputting the videos on the 1-2 region 1510 and the third region 1430, respectively.

Meanwhile, the controller 180 may output a plurality of thumbnail images corresponding to the plurality of videos, respectively, in a dividing manner for each of the plurality of videos, when a preset touch is applied to the timeline of the first full video.

Figure 18:
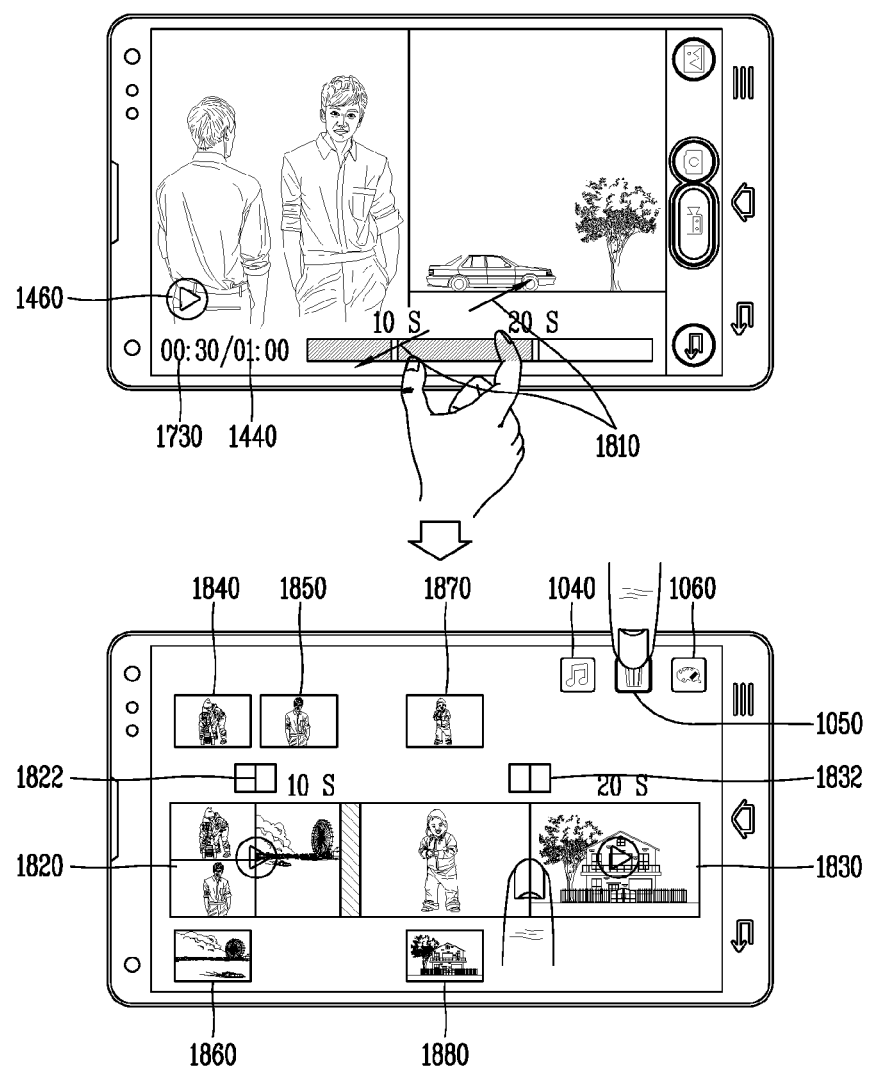
FIG. 18 is a conceptual view illustrating an embodiment of outputting video clips corresponding to a full video generated in FIG. 17.

FIG. 18 is a conceptual view illustrating an embodiment of outputting video clips corresponding to a full video generated in FIG. 17.

Referring to FIG. 18, when a pinch-out input 1810 is applied to the timeline of the third full video illustrated in FIG. 17, as described with reference to FIG. 10, the timeline of the third full video may be enlarged. Or, when a double-tap input is applied to the timeline of the third full video, the timeline of the third full video may be enlarged.

In an exemplary embodiment, a video clip 1820 corresponding to the first full video and a video clip 1820 corresponding to the second full video may be output in an enlarged manner. Also, edit icons 1040, 1050 and 1060 for editing the video clips may be output.

In this instance, detailed attribute information related to the video clips 1820 and 1830 may additionally be output. For example, whether or not the video clip is a video or a capture image, a video reproduction time, the cameras which have captured the video clips, thumbnail images corresponding to the videos captured by the cameras, respectively, or the like may be output, as the attribute information.

In an exemplary embodiment, a screen division icon 1822 may be output to indicate that the first full video has been captured by the first front camera, the second front camera and the rear camera. Also, a thumbnail image 1840 corresponding to the video which has been captured by the first front camera and output on the first region 1410, a thumbnail image 1850 corresponding to the video which has been captured by the second front camera and output on the second region 1420, and a thumbnail image 1860 corresponding to the video which has been captured by the rear camera and output on the third region 1430 may be output.

Each of the thumbnail images 1840, 1850 and 1860 may be one representative image of each video, or a video clip of each video. For example, when a touch input is applied to the thumbnail image 1840 corresponding to the video output on the first region 1410, the video (i.e., the video captured by the first front camera in the first full video) output on the first region 1410 may be independently reproduced on the output region of the thumbnail image 1840.

Similar to this, a screen division icon 1832 may be output to indicate that the second full video has been captured by the second front camera and the rear camera. Also, a thumbnail image 1870 corresponding to the video which has been captured by the second front camera and output on the 1-2 region 1500, and a thumbnail image 1880 corresponding to the video which has been captured by the rear camera and output on the third region 1430 may be output.

Each of the thumbnail images 1870 and 1880 may be one representative image of each video, or a video clip of each video. For example, when a touch input is applied to the thumbnail image 1870 corresponding to the video output on the 1-2 region 1500, the video (i.e., the video captured by the second front camera in the first full video) output on the 1-2 region 1500 may be independently reproduced on the output region of the thumbnail image 1870.

Meanwhile, the controller 180 may edit at least one of the plurality of thumbnail images, in response to a preset touch input applied to the at least one thumbnail image.

That is, even when videos are captured by a plurality of cameras, similar to the embodiment illustrated in FIGS. 10 to 13, the edition, such as deletion, BGM insertion, specific effect addition, sequence change, and the like may be carried out.

Hereinafter, an embodiment of editing video clips will be described with reference to FIGS. 18 to 21.

In an exemplary embodiment, referring back to FIG. 18, after selecting the delete icon 1050, when a touch input is applied to the video clip 1830 corresponding to the second full video, the second full video may be deleted from the third full video. Afterwards, when a touch input applied to the reproduction icon 1460 in the camera preview mode, the full video (i.e., the first full video) without the second full video may thusly be reproduced.

Figure 19:
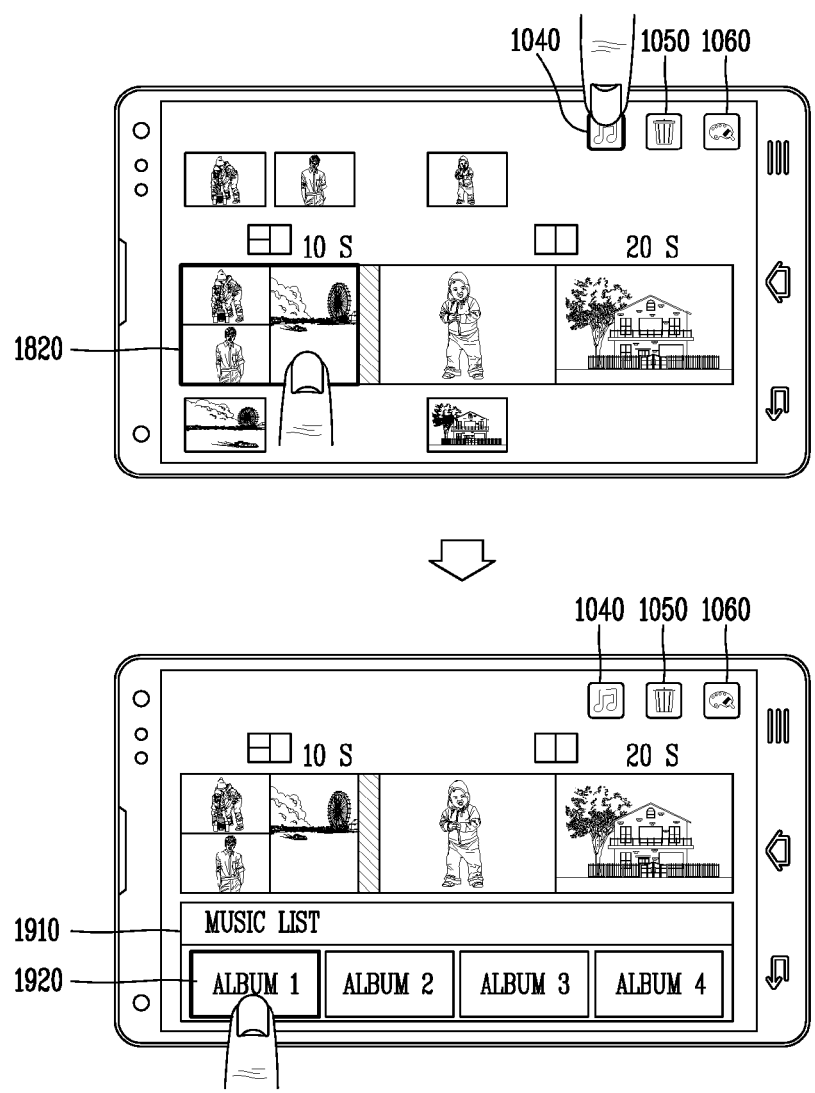
FIG. 19 is a conceptual view illustrating an embodiment of inserting music (or music file) into a part of the video clips output in FIG. 18.

FIG. 19 is a conceptual view illustrating an embodiment of inserting music or a music file into a part of the video clips output in FIG. 18.

As illustrated in FIG. 19, after the BGM icon 1040 is selected, when a touch input is applied to the video clip 1820 corresponding to the first full video, a music list 1910 to be insertable may be output. When a touch input is applied to one album 1920, the album may be reproduced while the first full video is reproduced.

In an exemplary embodiment, the music list to be insertable may be preset by the user or may be a music list that the user has frequently played back. Or, the music list may be a list of music recommended as music appropriate for the currently-selected first full video.

In detail, when a touch input is applied to the reproduction icon 1460 in the camera preview mode later, the third full video may be reproduced. In this instance, the second full video may be reproduced consecutively (immediately) after the first full video is reproduced along with the music.

Figure 20:
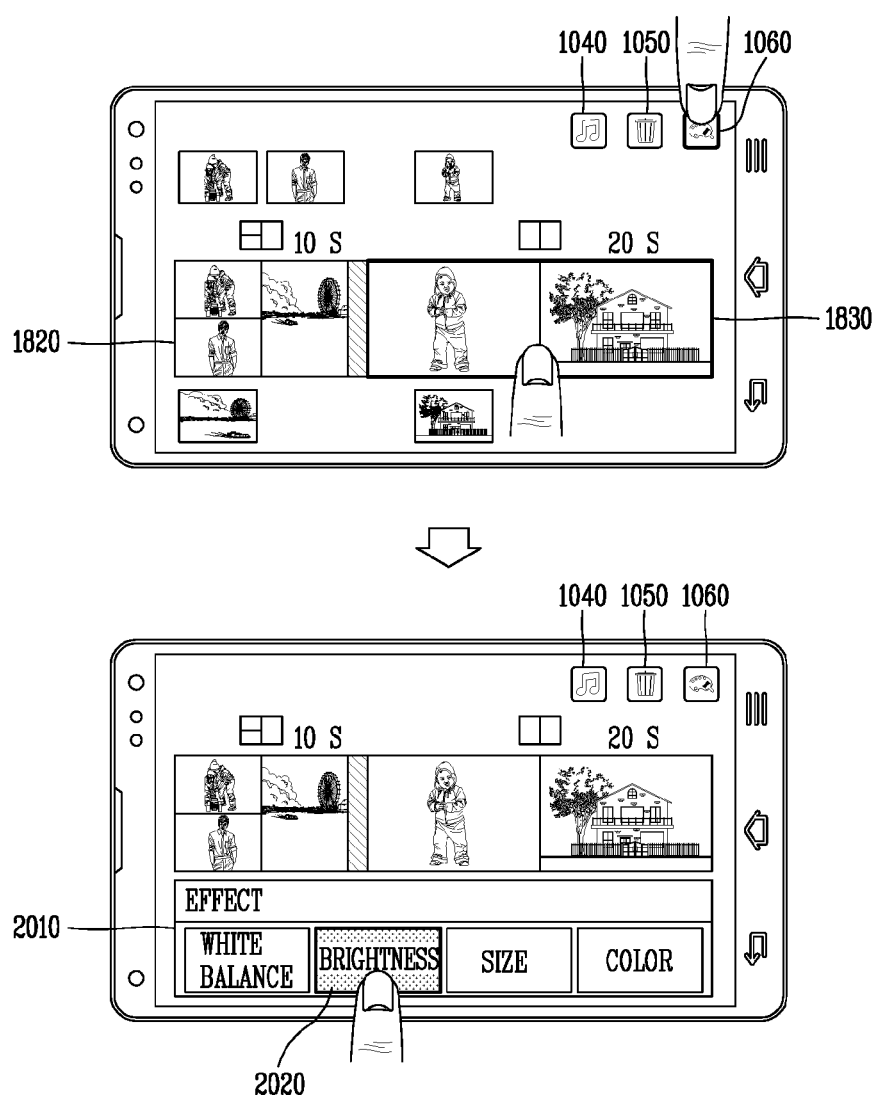
FIG. 20 is a conceptual view illustrating an embodiment of applying an image effect to a part of the video clips output in FIG. 18.

FIG. 20 is a conceptual view illustrating an embodiment of applying an image effect to a part of the video clips output in FIG. 18.

Referring to FIG. 20, after selecting the effect icon 1060, when a touch input is applied to the video clip 1830 corresponding to the second full video, an image effect list 2010 to be applicable may be output. When a touch input is applied to one image effect 2020 included in the effect list 2020, the image effect may be applied during the reproduction of the second full video.

In detail, when a touch input is applied to the reproduction icon 1460 in the camera preview mode later, the third full video may be reproduced. In this instance, when an effect of making an image bright, the second full video of which brightness has been adjusted may be reproduced consecutively (immediately) after the first full video is reproduced.

Figure 21:
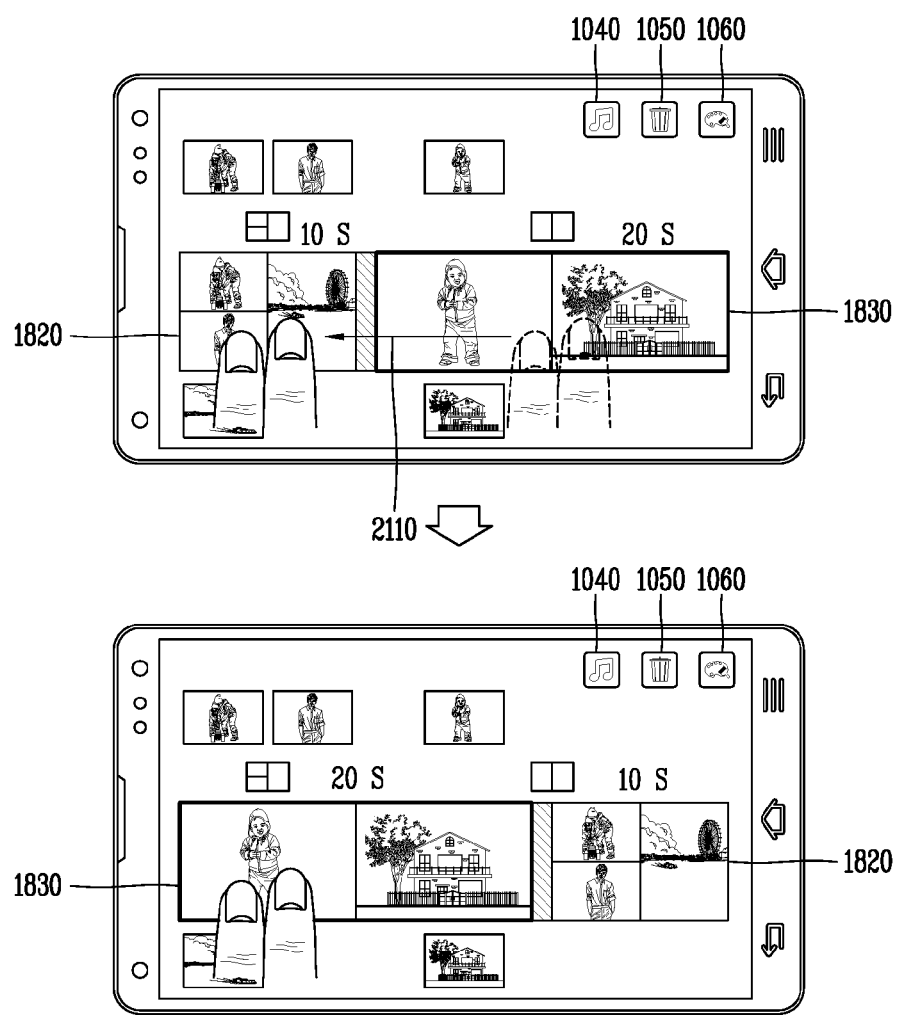
FIG. 21 is a conceptual view illustrating an embodiment of changing a sequence of video clips output in FIG. 18.

FIG. 21 is a conceptual view illustrating an embodiment of changing a sequence of video clips output in FIG. 18.

As illustrated in FIG. 21, after a touch input is applied to the video clip 1830 corresponding to the second full video with two fingers, a drag input 2110 may be applied toward the front of the video clip 1820 corresponding to the first full video.

Accordingly, the reproduction sequence of the first full video and the second full video may be changed. That is, when a touch input is applied to the video reproduction icon 1460 in the camera preview mode later, the first full video may be reproduced consecutively after the second full video is reproduced.

Meanwhile, the controller 180 may delete one of the plurality of thumbnail images and a video corresponding to the one thumbnail image, in response to a preset touch input applied to the one thumbnail image. The controller 180 may then edit a video re-captured by the camera, which has captured the video corresponding to the deleted thumbnail image, to be a part of the first full video, in response to a preset user input.

Figure 22:
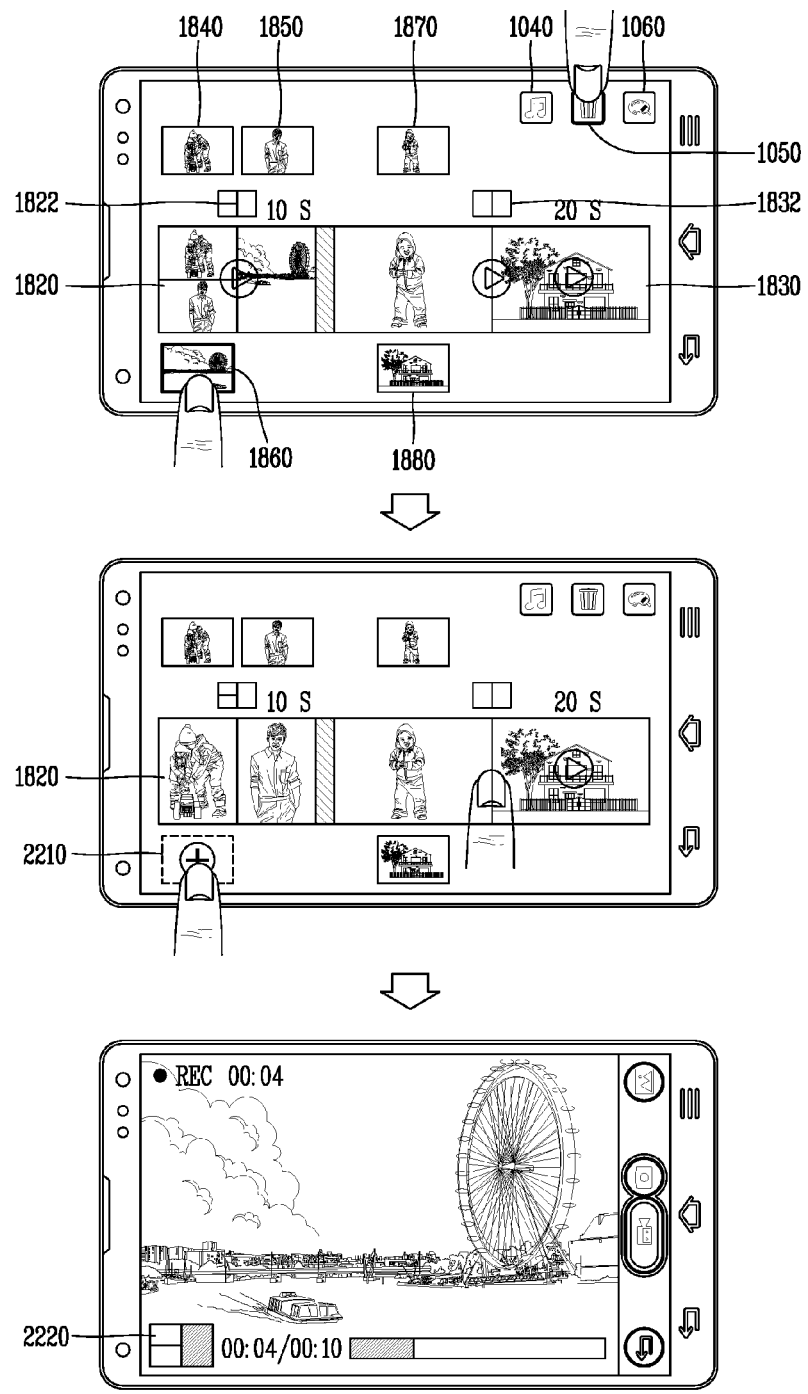
FIG. 22 is a conceptual view illustrating an embodiment of deleting a partial video of the video clips output in FIG. 18, and capturing a video to replace the deleted video.

FIG. 22 is a conceptual view illustrating an embodiment of deleting a part of videos corresponding to the video clips output in FIG. 18, and capturing a video to replace the deleted video.

As illustrated in FIG. 22, after the delete icon 1050 is selected, a touch input may be applied to a thumbnail image 1860 corresponding to a video (1-3 video), which has been captured by the rear camera and output on the third region 1430, of the first full video.

Accordingly, the thumbnail image 1860 may be deleted and an add icon 2210 for adding a new video may be output.

Also, thumbnail images may be output on two divided regions may be output on the video clip 1820 of the first full video.

In an exemplary embodiment, when a touch input is applied to the video clip 1820 of the first full video, the edited first full video may be reproduced. In detail, only the videos captured by the first front camera and the second front camera may be output on the two divided regions. That is, the video captured by the rear camera may be deleted.

In another exemplary embodiment, when a touch input is applied to the reproduction icon 1460 in the camera preview mode later, the third full video may be reproduced. In this instance, during the reproduction of the first full video, only the videos captured by the first front camera and the second front camera may be output on the two divided regions. Consecutive to those videos, the second full video may be reproduced.

In another exemplary embodiment, when a touch input is applied to the add icon 2210, a video which is to be inserted in replacement of the 1-3 video deleted from the first full video may be captured. In this instance, re-capturing may be executed for the same period of time as the previous capturing by the camera which has captured the 1-3 video. In detail, video capturing (capturing a 1-4 video) may be carried out for ten seconds by the rear camera.

Afterwards, when a touch input is applied to the reproduction icon in the camera preview mode, the edited third full video may be reproduced. In detail, the second full video may be reproduced consecutively (immediately) after the reproduction of the first full video. The video which is output on the third region 1330 in the edited first full video may be changed from the 1-3 video into the 1-4 video.

Hereinafter, effects provided by a mobile terminal and a control method thereof according to the present invention will be described.

In accordance with at least one embodiment of the present invention, a captured first video and a second video which is additionally captured consecutive to the first video can be reproduced and stored as a single file without a separate edition process.

Also, in accordance with at least one embodiment of the present invention, a video and a capture image can be reproduced and stored as a single file without a separate edition process.

This may result in enhancing user convenience and facilitating the user to generate a video for each meaningful episode.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a display unit outputting a first video captured in response to a preset user input, and outputting a timeline of the first video in a camera preview mode;
   a camera capturing a second video subsequent to the first video, in response to a preset user input; and
   a controller storing the first video and the second video as one single video, and outputting a timeline of the one single video, wherein a timeline of the second video follows the timeline of the first video, in the camera preview mode,
   wherein the controller controls the display unit to:
   output a thumbnail image corresponding to a time point of the one single video on an output region, in response to a preset touch input applied to the timeline of the one single video, and
   reproduce the one single video starting from the time point corresponding to the thumbnail image on the output region, in response to a preset touch input applied to the thumbnail image.

2. The terminal of claim 1, wherein the controller controls the display unit to output a plurality of thumbnail images corresponding to the first video and the second video, in response to a preset touch input applied to the timeline of the one single video.

3. The terminal of claim 2, wherein the controller controls the display unit to output a delete icon at a position adjacent to the timeline of the one single video, wherein the delete icon is provided for deleting at least one of the plurality of thumbnail images corresponding to the first video and the second video.

4. The terminal of claim 2, wherein the controller edits at least one of the plurality of thumbnail images, in response to a preset touch input applied to the at least one thumbnail image.

5. The terminal of claim 1, wherein the controller controls the display unit to output a plurality of videos captured by each of a plurality of cameras on divided screen regions of the display unit, respectively, in response to a preset user input, stores the plurality of videos as a second, single video, and further controls the display unit to output a timeline of the second, single video in the camera preview mode.

6. The terminal of claim 5, wherein the controller controls the display unit to output a plurality of thumbnail images corresponding to the plurality of videos displayed on separate screen regions of the display unit, respectively, in response to a preset touch input applied to the timeline of the second, single video.

7. The terminal of claim 6, wherein the controller edits at least one of the plurality of thumbnail images, in response to a preset touch input applied to the at least one thumbnail image.

8. The terminal of claim 6, wherein the controller deletes one of the plurality of thumbnail images and a video corresponding to the one thumbnail image, in response to a preset touch input applied to the one thumbnail image, and
   wherein the controller recaptures the video corresponding to the deleted thumbnail image to be a part of the second, single video, in response to a preset user input.

9. The terminal of one of claim 5, wherein the controller captures a third video subsequent to the second, single video in response to a preset user input, stores the second, single video and the third video as a fourth, single video, and controls the display unit to output a timeline of the fourth, single video in the camera preview mode.

10. A method for controlling a mobile terminal, the method comprising:
    (a) outputting a first video captured in response to a preset touch input, and outputting a timeline of the first video in a camera preview mode;
    (b) capturing a second video subsequent the first video in response to a preset user input; and
    (c) storing the first video and the second video as one single video, and outputting a timeline of the one single video, wherein a timeline of the second video follows the timeline of the first video, in the camera preview mode;
    wherein the step (c) comprises
    outputting a thumbnail image corresponding to a time point of the one single video on an output region, in response to a preset touch input applied to the timeline of the one single video, and
    reproducing the one single video starting from the time point corresponding to the thumbnail image on the output region, in response to a preset touch input applied to the thumbnail image.

11. The method of claim 10, wherein the step (c) comprises outputting a plurality of thumbnail images corresponding to the first video and the second video, in response to a preset touch input applied to the timeline of the one single video.

12. The method of claim 11, wherein the step (c) comprises outputting a delete icon at a position adjacent to the timeline of the one single video, wherein the delete icon is provided for deleting at least one of the plurality of thumbnail images corresponding to the one single video.

13. The method of claim 11, wherein the step (c) comprises editing at least one of the plurality of thumbnail images, in response to a preset touch input applied to the at least one thumbnail image.

14. The method of claim 10, wherein the step (a) comprises outputting a plurality of videos captured by a plurality of cameras on divided screen regions of a display unit, respectively, in response to a preset user input, storing the plurality of videos as a second, single video, and outputting a timeline of the second, single video in the camera preview mode.

15. The method of claim 14, wherein the step (a) further comprises outputting a plurality of thumbnail images corresponding to the plurality of videos on separate screen regions of the display unit, respectively, in response to a preset touch input applied to the timeline of the second, single video.

16. The method of claim 15, wherein the step (a) further comprises editing at least one of the plurality of thumbnail images in response to a preset touch input applied to the at least thumbnail image.

17. The method of claim 16, wherein the step (a) further comprises:
    deleting one of the plurality of thumbnail images and the video corresponding to the one thumbnail image, in response to a preset touch input applied to the one thumbnail image, and
    recapturing the video corresponding to the deleted thumbnail image, to be a part of the second, single video, in response to a preset user input.

18. The method of claim 14 further comprising:
    capturing a third video subsequent the second, single video, in response to a preset user input,
    storing the second, single video and the third video as a fourth, single video, and
    outputting a timeline of the fourth, single video in the camera preview mode.

* * * * *